(12) United States Patent
Ueda

(10) Patent No.: US 12,335,882 B2
(45) Date of Patent: Jun. 17, 2025

(54) BASE STATION, COMMUNICATION SYSTEM, COMMUNICATION METHOD, AND NON-TRANSITORY COMPUTER-READABLE MEDIUM

(71) Applicant: NEC Corporation, Tokyo (JP)

(72) Inventor: Yoshio Ueda, Tokyo (JP)

(73) Assignee: NEC CORPORATION, Tokyo (JP)

(*) Notice: Subject to any disclaimer, the term of this patent is extended or adjusted under 35 U.S.C. 154(b) by 693 days.

(21) Appl. No.: 17/629,447

(22) PCT Filed: Feb. 3, 2021

(86) PCT No.: PCT/JP2021/003992
§ 371 (c)(1),
(2) Date: Jan. 24, 2022

(87) PCT Pub. No.: WO2021/199666
PCT Pub. Date: Oct. 7, 2021

(65) Prior Publication Data
US 2022/0248351 A1    Aug. 4, 2022

(30) Foreign Application Priority Data

Mar. 30, 2020 (JP) ................... 2020-060940

(51) Int. Cl.
*H04W 56/00* (2009.01)
(52) U.S. Cl.
CPC .................. *H04W 56/001* (2013.01)

(58) Field of Classification Search
CPC .......... H04W 56/001; H04W 56/0035; H04W 56/005; H04W 56/0015; H04W 92/20
See application file for complete search history.

(56) References Cited

U.S. PATENT DOCUMENTS

| | | |
|---|---|---|
| 5,826,197 A | 10/1998 | Nagata et al. |
| 10,085,225 B2 | 9/2018 | Zheng et al. |
| 2010/0260168 A1* | 10/2010 | Gheorghiu ........ H04W 56/0015 370/350 |
| 2013/0281080 A1 | 10/2013 | Carmon |
| 2017/0055237 A1* | 2/2017 | Byun ................ H04W 56/0015 |
| 2019/0124612 A1 | 4/2019 | Ruffini et al. |

FOREIGN PATENT DOCUMENTS

| | | |
|---|---|---|
| JP | 2008-228177 A | 9/2008 |
| JP | 2010-068127 A | 3/2010 |
| JP | 2010-170243 A | 8/2010 |
| JP | 5579826 B | 8/2014 |
| WO | 96/001545 A1 | 1/1996 |

(Continued)

OTHER PUBLICATIONS

Extended European Search Report for EP Application No. 2177996. 0, dated on Sep. 12, 2022.
ZTE, "Synchronization solution for TDD HeNB", 3GPP TSG RAN WG3#66bis, R3-100176, Jan. 15, 2010.

(Continued)

*Primary Examiner* — Kyaw Z Soe
(74) *Attorney, Agent, or Firm* — Sughrue Mion, PLLC

(57) ABSTRACT

A first base station (131) is configured to notify a second base station (132) of frequency accuracy information indicating frequency accuracy of the first base station (131) in a wireless manner or via a backhaul.

13 Claims, 15 Drawing Sheets

| BS class | Accuracy |
|---|---|
| Wide Area BS | ±0.05 ppm |
| Medium Range BS | ±0.1 ppm |
| Local Area BS | ±0.1 ppm |
| Home BS | ±0.25 ppm |

(56) References Cited

FOREIGN PATENT DOCUMENTS

| WO | 2013/141148 A1 | 9/2013 |
|----|----------------|--------|
| WO | 2018/128019 A1 | 7/2018 |

OTHER PUBLICATIONS

TSG-RAN WG4, "Support for time and frequency synchronization using network listening", 3GPP TSG RAN WG2 Meeting #67bis, R2-095423_R4-093465, Jan. 2, 2010.
JP Office Communication for JP Application No. 2022-511599, mailed on Feb. 6, 2024 with English Translation.
CMCC, Huawei, "BLCR for TS 38.413 for support of SON on NGAP", 3GPP TSG RAN WG3 #105 R3-194402, Aug. 30, 2019, pp. 1-pp. 6.
International Search Report for PCT Application No. PCT/JP2021/003992, mailed on Apr. 27, 2021.
3GPP TS38.104 V16.2.0 (Dec. 2019), pp. 1-239.
3GPP TS36.104 V16.4.0 (Dec. 2019), pp. 1-268.
3GPP TR36.872 V12.1.0 (Dec. 2013), pp. 1-100.
3GPP TR36.922 V15.0.0 (Jun. 2018), pp. 1-73.
3GPP TS36.413 V16.0.0 (Dec. 2019), pp. 1-390.
3GPP TS37.340 V16.0.0 (Dec. 2019), pp. 1-72.
3GPP TS23.501 V16.3.0 (Dec. 2019), pp. 1-417.
3GPP TS38.413 V16.0.0 (Dec. 2019), pp. 1-335.
3GPP TS38.423 V16.0.0 (Dec. 2019), pp. 1-330.
RP-191981, CATT, [Draft] "New WID on NR Network Synchronization", 3GPP TSG RAN #85, Sep. 9, 2019, pp. 1-5.
Japanese Office Action for JP Application No. 2022-511599 mailed on Feb. 14, 2023 with English Translation.

* cited by examiner

| BS class | Accuracy |
|---|---|
| Wide Area BS | ±0.05 ppm |
| Medium Range BS | ±0.1 ppm |
| Local Area BS | ±0.1 ppm |
| Home BS | ±0.25 ppm |

Fig. 1

| BS class | Prated, c |
|---|---|
| Wide Area BS | —(none) |
| Medium Range BS | ≤ +38 dBm |
| Local Area BS | ≤ +24 dBm |
| Home BS | ≤ +20 dBm (for one transmit antenna port)<br>≤ +17 dBm (for two transmit antenna port)<br>≤ +14 dBm (for four transmit antenna port)<br>≤ +11 dBm (for eight transmit antenna port) |
| NOTE:<br>There is no upper limit for the rated output power of the Wide Area Base Station. | |

Fig. 2

9.2.3.34 Time Synchronisation Info

The *Time Synchronisation Info* IE is used for signalling stratum level, synchronisation status and muting availability for over-the-air synchronisation using network listening.

| IE/Group Name | Presence | Range | IE type and reference | Semantics description | Criticality | Assigned Criticality |
|---|---|---|---|---|---|---|
| Synchronisation Info | | | | | | |
| >Stratum Level | M | | INTEGER (0..3,....) | | | |
| >Synchronisation status | M | | ENUMERATED (Synchronous, Asynchronous, ...) | | | |
| >Muting Availability indication | O | | ENUMERATED (Available, Unavailable, ...) | Indicates availability of muting activation. | YES | ignore |

Fig. 4

| BASE STATION NO. | BASE STATION CLASS | STRATUM LEVEL | SYNCHRONIZATION STATUS | SYNCHRONIZATION SOURCE | FREQUENCY ACCURACY | CUMULATIVE FREQUENCY ACCURACY | SYNCHRONIZATION SCHEME |
|---|---|---|---|---|---|---|---|
| BASE STATION 111 | Wide Area BS | 0 | IN-SYNC | GPS | 0.05 ppm | 0.05 ppm | GPS |
| BASE STATION 112 | Wide Area BS | 0 | IN-SYNC | GPS | 0.05 ppm | 0.05 ppm | GPS |
| BASE STATION 113 | Home BS | 1 | IN-SYNC | BASE STATION 111 | 0.25 ppm | 0.30 ppm | NETWORK LISTENING |
| BASE STATION 114 | Local Area BS | 1 | IN-SYNC | BASE STATION 112 | 0.1 ppm | 0.15 ppm | NETWORK LISTENING |
| BASE STATION 115 | Local Area BS | 2 | IN-SYNC | BASE STATION 114 | 0.1 ppm | 0.25 ppm | NETWORK LISTENING |

Fig. 10

| BASE STATION NO. | BASE STATION CLASS | STRATUM LEVEL | SYNCHRONIZATION STATUS | SYNCHRONIZATION SOURCE | FREQUENCY ACCURACY | CUMULATIVE FREQUENCY ACCURACY | SYNCHRONIZATION SCHEME |
|---|---|---|---|---|---|---|---|
| BASE STATION 111 | Wide Area BS | 0 | IN-SYNC | GPS | 0.02 ppm | 0.02 ppm | GPS |
| BASE STATION 112 | Wide Area BS | 0 | IN-SYNC | GPS | 0.02 ppm | 0.02 ppm | GPS |
| BASE STATION 113 | Home BS | 1 | IN-SYNC | BASE STATION 111 | 0.12 ppm | 0.14 ppm | NETWORK LISTENING |
| BASE STATION 114 | Local Area BS | 1 | IN-SYNC | BASE STATION 112 | 0.05 ppm | 0.07 ppm | NETWORK LISTENING |
| BASE STATION 115 | Local Area BS | 2 | IN-SYNC | BASE STATION 114 | 0.05 ppm | 0.12 ppm | NETWORK LISTENING |

Fig. 12

| BASE STATION NO. | BASE STATION CLASS | SYNCHRONIZATION STATUS | SYNCHRONIZATION SOURCE | FREQUENCY ACCURACY | STRATUM LEVEL | CUMULATIVE STRATUM LEVEL | SYNCHRONIZATION SCHEME |
|---|---|---|---|---|---|---|---|
| BASE STATION 111 | Wide Area BS | IN-SYNC | GPS | 0.02 ppm | 1 | 1 | GPS |
| BASE STATION 112 | Wide Area BS | IN-SYNC | GPS | 0.02 ppm | 1 | 1 | GPS |
| BASE STATION 113 | Home BS | IN-SYNC | BASE STATION 111 | 0.12 ppm | 3 | 4 | NETWORK LISTENING |
| BASE STATION 114 | Local Area BS | IN-SYNC | BASE STATION 112 | 0.05 ppm | 1 | 2 | NETWORK LISTENING |
| BASE STATION 115 | Local Area BS | IN-SYNC | BASE STATION 114 | 0.05 ppm | 1 | 3 | NETWORK LISTENING |

Fig. 13

BASE STATION, COMMUNICATION SYSTEM, COMMUNICATION METHOD, AND NON-TRANSITORY COMPUTER-READABLE MEDIUM

This application is a National Stage Entry of PCT/JP2021/003992 filed on Feb. 3, 2021, which claims priority from Japanese Patent Application 2020-060940 filed on Mar. 30, 2020, the contents of all of which are incorporated herein by reference, in their entirety.

TECHNICAL FIELD

The present disclosure relates to a base station, a communication system, a communication method, and a non-transitory computer-readable medium.

BACKGROUND ART

In a 5G (NR (New Radio)) system and an LTE (Long Term Evolution) system, it is necessary to establish and maintain frequency synchronization. In the 5G system and the LTE system, it is also necessary to establish and maintain phase synchronization depending on a purpose of use of TDD (Time Division Duplex) and mobile applications. However, when synchronization (hereinafter, referred to as GPS synchronization) is performed using GPS signals received from GPS (Global Positioning System), antenna cable wiring and a distribution amplifier are required, and thus a capital expenditure (CAPEX) and operation and maintenance costs will increase.

Further, compared to a WiFi (Wireless Fidelity) system, the 5G system and the LTE system are strictly required to have necessary synchronization accuracy. In a local 5G system, since interference with other radio systems (public business radio stations and satellite communications) needs to be avoided depending on applicable frequency bands, the purpose of use may be limited to factories (Society 5.0) and indoors. However, GPS signals cannot be stably received from GPS satellites in the factories and indoors, resulting in causing a problem in an introduction of a synchronization scheme using GPS.

Therefore, it is considered that a radio interface based synchronization scheme including a multi-hop, that is, a synchronization scheme using network listening is important for 5G. The synchronization scheme using network listening is disclosed in Patent Literature 1, for example.

In Patent Literature 1, a base station notifies the other base station of synchronization stratum information equivalent to a stratum level. The stratum level indicates the number of hops from a base station that performs GPS synchronization. The base station can notify, according to the stratum level, the number of intermediate nodes (relay base stations) existing in a synchronization path between the own base station and the base station that performs GPS synchronization. The other base station determines a stratum level of one or a plurality of base stations, and synchronizes with a base station having the lowest stratum level.

CITATION LIST

Patent Literature

Patent Literature 1: Japanese Patent No. 5579826

Non Patent Literature

Non Patent Literature 1: 3GPP TS38. 104 V16. 2.0 (2019-12)
Non Patent Literature 2: 3GPP TS36. 104 V16. 4.0 (2019-12)
Non Patent Literature 3: 3GPP TR36. 872 V12. 1.0 (2013-12)
Non Patent Literature 4: 3GPP TR36. 922 V15. 0.0 (2018-06)
Non Patent Literature 5: 3GPP TS36. 413 V16. 0.0 (2019-12)
Non Patent Literature 6: 3GPP TS37. 340 V16. 0.0 (2019-12)
Non Patent Literature 7: 3GPP TS23. 501 V16. 3.0 (2019-12)
Non Patent Literature 8: 3GPP TS38. 413 V16. 0.0 (2019-12)
Non Patent Literature 9: 3GPP TS38. 423 V16. 0.0 (2019-12)

SUMMARY OF INVENTION

Technical Problem

In Patent Literature 1, however, the stratum level notified by the base station does not always match frequency accuracy capable of being guaranteed by the base station. The frequency accuracy indicates a frequency error which is a difference between a frequency assigned to the base station and a frequency at which the base station itself transmits and receives a radio frame. For this reason, in Patent Literature 1, it is not possible to select a base station with higher frequency accuracy and perform synchronization using network listening. Therefore, the frequency accuracy of the base station cannot be guaranteed as defined by 3 GPP (Third Generation Partnership Project) in the case of using the multi-hop.

An object of the present disclosure is to contribute to the solution of the above-described problem, and to provide a base station, a communication system, a communication method, and a non-transitory computer-readable medium that enable synchronization with a base station having higher frequency accuracy using network listening.

Solution to Problem

A base station as a first base station according to an aspect includes:
at least one memory; and
at least one processor coupled to the at least one memory,
the at least one processor being configured to notify a second base station of frequency accuracy information indicating frequency accuracy of the first base station in a wireless manner or via a backhaul.

A base station as a second base station according to another aspect includes:
at least one memory; and
at least one processor coupled to the at least one memory,
the at least one processor being configured to acquire, from a first base station, frequency accuracy information indicating frequency accuracy of the first base station in a wireless manner or via a backhaul.

A communication system according to an aspect includes:
a first base station; and
a second base station,
the first base station being configured to notify the second base station of frequency accuracy information indicating frequency accuracy of the first base station in a wireless manner or via a backhaul.

A communication method according to an aspect is performed by a base station as a first base station and includes:
a step of notifying a second base station of frequency accuracy information indicating frequency accuracy of the first base station in a wireless manner or via a backhaul.

A communication method according to another aspect is performed by a base station as a second base station and includes:
a step of acquiring, from a first base station, frequency accuracy information indicating frequency accuracy of the first base station in a wireless manner or via a backhaul.

A non-transitory computer-readable medium according to an aspect is configured to store a program that causes a computer to perform a communication method for a base station as a first base station,
the communication method including a step of notifying a second base station of frequency accuracy information indicating frequency accuracy of the first base station in a wireless manner or via a backhaul.

A non-transitory computer-readable medium according to another aspect is configured to store a program that causes a computer to perform a communication method for a base station as a second base station,
the communication method including a step of acquiring, from a first base station, frequency accuracy information indicating frequency accuracy of the first base station in a wireless manner or via a backhaul.

Advantageous Effects of Invention

According to the above-described aspects, it is possible to provide a base station, a communication system, a communication method, and a non-transitory computer-readable medium that enable synchronization with a base station having higher frequency accuracy using network listening.

BRIEF DESCRIPTION OF THE DRAWINGS

FIG. 1 is a view showing an example of frequency accuracy for each base station class defined by 3 GPP.

FIG. 2 is a view showing an example of an upper limit of transmission output power for each base station class defined by 3 GPP.

FIG. 4 is a view showing an example of time synchronization information defined by 3 GPP.

FIG. 10 is a view showing an example of a list of information regarding each base station shown in FIG. 6.

FIG. 12 is a view showing another example of a list of information regarding each base station shown in FIG. 6.

FIG. 13 is a view showing a further another example of a list of information regarding each base station shown in FIG. 6.

DESCRIPTION OF EXAMPLE EMBODIMENTS

Related Art

Figure 3:
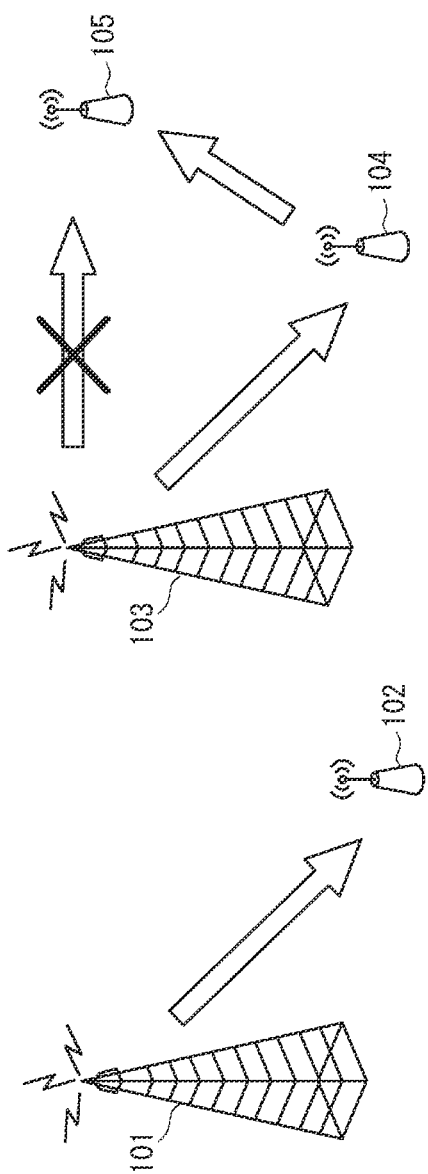
FIG. 3 is a view showing an example of a synchronization scheme of a network listening base.

First, a related art of the present disclosure will be described in detail before a description of an example embodiment according to the present disclosure.

In an LTE system and an NR system, frequency accuracy of a base station is defined by 3 GPP. The frequency accuracy indicates a frequency error which is a difference between a frequency assigned to the base station and a frequency at which the base station itself transmits and receives a radio frame, as described above. Therefore, the base station needs to keep the frequency accuracy with a range of the frequency accuracy defined by 3 GPP. The frequency accuracy in the NR system is defined in Non Patent Literature 1 (3GPP TS38. 104), and the frequency accuracy in the LTE system is defined in Non Patent Literature 2 (3GPP TS36. 104).

FIG. 1 is a view showing an example of frequency accuracy for each base station class defined by 3 GPP. For example, the frequency accuracy of the base station of a Local Area BS class is defined as ±0.1 ppm (parts per million). Here, for example, it is assumed that 2585 MHz of a band 41 is assigned to the base station of the Local Area BS class. The term "ppm" indicates one millionth (1/1000000). Therefore, 0.1 ppm of 2585 MHz is expressed by the following formula.

0.1 ppm of 2585 MHz=2585 MHz/1000000*0.1=258.5 Hz

Accordingly, in order to operate with the frequency accuracy defined by 3 GPP, the Local Area BS class of the base station needs to transmit and receive a radio frame at a frequency within a range of 2585 MHz±258.5 Hz, that is, within a range of 2584999741.5 Hz to 2585000258.5 Hz.

In the LTE system and the NR system, an upper limit of transmission output power of the base station is also defined by 3 GPP. FIG. 2 is a view showing an example of an upper limit of transmission output power for each base station class defined by 3 GPP. For example, an upper limit of transmission output power of a base station of a Medium Range BS class is defined as 38 dBm, and an upper limit of transmission output power of a base station of a Local Area BS class is defined as 24 dBm. In addition, an upper limit of transmission output power of a base station of a Home BS class is defined as 11 dBm to 20 dBm depending on the number of transmit antenna ports. On the other hand, for a base station of a Wide Area BS class, an upper limit of transmission output power is not defined.

In the base station, an example of a synchronization scheme for synchronizing frequency and phase generally includes a synchronization scheme using GNSS (Global Navigation Satellite System) such as GPS. For example, when GPS is used, the base station uses GPS signals received from a GPS satellite to perform GPS synchronization. However, for example, the GPS satellite does not navigate so much to the north in the northern hemisphere. For this reason, since a base station in a building looking toward a north window cannot stably receive GPS signals in the northern hemisphere, and thus cannot perform stable GPS synchronization. In order to make the base station in the building perform stable GPS synchronization, for example, a method can also be considered in which GPS signals received by a GPS antenna installed outdoors are distributed to the base station in the building. However, such a method has a problem that the GPS signals received by the GPS antenna need to be amplified and distributed, and a problem that a great cost is required for wiring of cables connecting the GPS antenna and the base station.

Further, an example of another synchronization scheme of the base station may include a synchronization scheme using a backhaul such as a TDM (Time division Multiplexing) network or SyncE (Synchronous Ethernet). The synchronization scheme using the backhaul uses an IEEE (Institute of Electrical and Electronics Engineers) 1588 v2/PTP (Precision Time Protocol) protocol, for example. However, the synchronization scheme using the backhaul is necessary to construct a new backhaul network. In order to realize frequency synchronization and phase synchronization using PTP, network devices, for example, a PTP grand master and a switch (BC (Boundary Clock)) compatible with PTP are required. As described above, the synchronization scheme using the backhaul has problems that a dedicated network and network devices are required to be introduced and a large operation and maintenance cost is required.

In the LTE, as another synchronization scheme of the base station, a radio interface based synchronization (RIBS) is suggested in Non Patent Literature 3 (3GPP TR36. 872) and Non Patent Literature 4 (3GPP TR36. 922). In the radio interface based synchronization, the base station itself (eNB (evolved Node B) or gNB) measures surrounding radio waves like a UE (User Equipment), and realizes frequency synchronization and phase synchronization using measurement results of the radio waves. In this way, that the base station itself measures the surrounding radio waves is generally called network listening, or is also called Sniffer, NMM (Network monitoring mode), or REM (Radio Environment Measurement). Hereinafter, for convenience, the radio interface based synchronization is called network listening based synchronization. Further, for convenience, the base station for providing synchronization to another base station is called a synchronization source base station, and the base station to be synchronized from the synchronization source base station is called a synchronization destination base station.

When an HeNB (Home eNB) is arranged in an indoor environment such as the inside of the building, the following scenario is assumed as a scenario for performing synchronization using network listening. For example, the HeNB of the Home BS class synchronizes with a macro base station of the Wide Area BS class as a synchronization source that performs GPS synchronization, using network listening, and another HeNB synchronizes with the HeNB as a synchronization source using network listening. In this way, a configuration in which synchronization is performed in a string using network listening is called a multi-hop.

For example, although depending on the frequency of the synchronization source base station, a material of a wall, a window glass, and a structure of a building, there is a case where the HeNB arranged in the indoor environment cannot receive radio waves from the macro base station. In this case, it is assumed that another HeNB receives radio waves from the macro base station once, and then the HeNB receives the radio waves from another HeNB, whereby synchronization is performed.

At this time, for each of the base stations, a stratum level indicating the number of hops from the base station performing GPS synchronization is defined as follows. When the macro base station performs GPS synchronization, the stratum level of the macro base station is 0. In addition, the stratum level of the HeNB, which synchronizes with the macro base station having stratum level 0 using network listening, is 1. Further, the stratum level of the HeNB, which synchronizes with the HeNB having stratum level 1 using network listening, is 2.

In the example of FIG. 3, the eNB 101 and eNB 103 perform GPS synchronization, and have stratum level 0. In addition, an HeNB 102 and an HeNB 104 synchronize with the eNB 101 and the eNB 103 having stratum level 0 using network listening, respectively, and thus have stratum level 1. In addition, an HeNB 105 synchronizes with the HeNB 104 having stratum level 1 using network listening, and thus has stratum level 2. Here, it is assumed that the HeNB 105 cannot detect the eNB 103 using network listening.

In the example of FIG. 3, an example is assumed in which the femtocell HeNB 104 synchronizes with the macrocell eNB 103 using network listening and the femtocell HeNB 105 synchronizes with the femtocell HeNB 104 using network listening, but the combination of base stations is not limited thereto, and may be any other combinations. For example, a picocell base station may synchronize with a microcell base station using network listening. Further, a microcell base station may synchronize with a macrocell base station using network listening, and a picocell base station may synchronize with a microcell base station using network listening. In addition, a microcell base station may synchronize with a macrocell base station using network listening, a picocell base station may synchronize with a microcell base station using network listening, and a femtocell base station may synchronize with a picocell base station using network listening.

In LTE, Non Patent Literature 5 (3GPP TS36. 413) defines a procedure for notifying a stratum level and a synchronization status between base stations. FIG. 4 is a view showing an example of time synchronization information defined in Non Patent Literature 5 (3GPP TS36. 413). In the time synchronization information in FIG. 4 includes IE (Information Element) of the stratum level and the synchronization status. The stratum level indicates the number of hops from the base station performing GPS synchronization to own base station, as described above. The base station can notify, according to the stratum level, the number of relay base stations existing in the synchronization path between the base station performing GPS synchronization to own base station.

Figure 5:
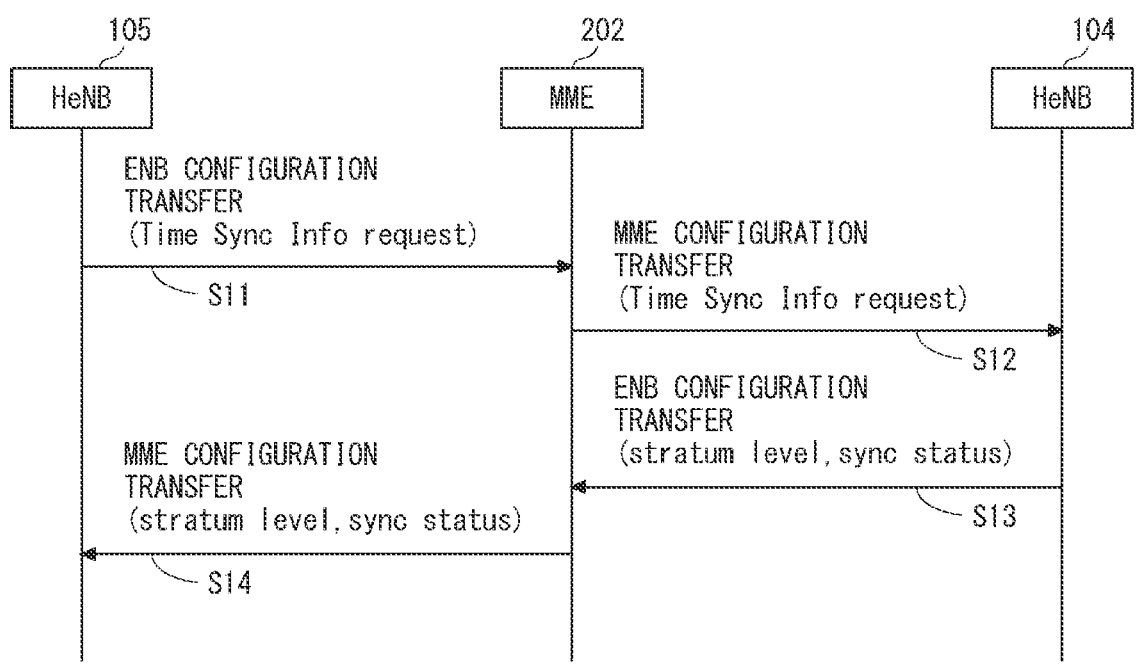
FIG. 5 is a sequence diagram showing an example of a method of transferring time synchronization information standardized by LTE.

In LTE, a method of transferring time synchronization information between the base stations (eNBs) via EPC (Evolved Packet Core) using an S1AP signal, which is an S1 interface signal, is standardized. FIG. 5 is a sequence diagram showing an example of a method of transferring the time synchronization information standardized in the LTE.

FIG. 5 shows an example in which the HeNB 104 in FIG. 3 transfers the time synchronization information to the HeNB 105.

As shown in FIG. 5, the HeNB 105 requests the HeNB 104 for time synchronization information via MME (Mobility Management Entity) 202 in the EPC using an ENB CONFIGURATION TRANSFER message and an MME CONFIGURATION TRANSFER message (steps S11 and S12). Accordingly, the HeNB 104 notifies the HeNB 105 of the time synchronization information including the stratum level information indicating the stratum level of the HeNB 104 and the synchronization status information indicating the synchronization status of the HeNB 104 via the MME 202 in the EPC using an MME CONFIGURATION TRANSFER message and an ENB CONFIGURATION TRANSFER message (steps S13 and S14). Patent Literature 1 also discloses that the base station notifies synchronization stratum information equivalent to the stratum level.

However, the related art has first and second problems as follows.

First, a first problem of the related art will be described.

As described above, the base station can notify the number of relay base stations existing in a synchronization path between the base station performing GPS synchronization and the own base station by the stratum level. However, the stratum level does not notify the frequency accuracy (frequency error) capable of being guaranteed by own base station. Therefore, in the case of using the multi-hop, the frequency accuracy of the base station to be finally connected may not be guaranteed only by the notification of the stratum level. This is the first problem.

For example, it is assumed in FIG. 3 that the eNB 103 is a base station of a Wide Area BS class and the HeNBs 104 and 105 are base stations of a Home BS class. In 3GPP, as shown in FIG. 1, the frequency accuracy for each base station class is defined. As shown in FIG. 1, the frequency accuracy of the eNB 103 of the Wide Area BS class is ±0.05 ppm, and the frequency accuracy of the HeNBs 104 and 105 of the Home BS class is ±0.25 ppm.

The frequency accuracy capable of being guaranteed solely by the eNB 103 of the Wide Area BS class is 0.05 ppm. Further, the eNB 103 performs GPS synchronization. For this reason, the frequency accuracy capable of being guaranteed by the eNB 103 is 0.05 ppm as it is.

On the other hand, the frequency accuracy capable of being guaranteed solely by the HeNB 104 of the Home BS class is 0.25 ppm. However, the HeNB 104 synchronizes with the eNB 103 of the Wide Area BS class using network listening. Therefore, the frequency accuracy capable of being guaranteed by the HeNB 104 is a value (a cumulative frequency accuracy to be described below) obtained by adding the frequency accuracy of 0.05 ppm that can be guaranteed solely by the eNB 103. Accordingly, the frequency accuracy capable of being guaranteed by the HeNB 104 is 0.05 ppm+0.25 ppm=0.30 ppm.

Further, the frequency accuracy capable of being guaranteed solely by the HeNB 105 of the Home BS is 0.25 ppm. However, the HeNB 105 synchronizes with the eNB 104 of the Home BS class using network listening, and the HeNB 104 also synchronizes with the eNB 103 of the Wide Area BS class using network listening. Therefore, the frequency accuracy capable of being guaranteed by the HeNB 105 is a value (a cumulative frequency accuracy to be described below) obtained by adding the frequency accuracy that can be guaranteed solely by the eNB 104 and the frequency accuracy of 0.05 ppm capable of being guaranteed solely by the eNB 103. Accordingly, the frequency accuracy capable of being guaranteed by the HeNB 105 is 0.05 ppm+0.25 ppm+0.25 ppm=0.55 ppm.

As described above, in the case of the multi-hop in FIG. 3, the frequency accuracy capable of being guaranteed by the HeNB 105 connected finally can be 0.55 ppm.

For example, assuming that 2585 MHz of band 41 is assigned to the HeNB 105 of the Home BS class. 0.55 ppm of 2585 MHz is expressed by the following formula.

0.55 ppm of 2585 MHz=2585 MHz/ 1000000*0.55=1421.75 Hz

Therefore, the HeNB 105 of the Home BS class will transmit and receive a radio frame at a frequency within a range of 2585 MHz±1421.75 Hz, that is, within a range of 2584998578.25 Hz to 2585001421.75 Hz. For this reason, in the case of using the multi-hop, the HeNB 105 cannot guarantee the frequency accuracy of ±0.25 ppm defined by 3 GPP.

In the case of using the multi-hop, when the base station transmits and receives the radio frame at a frequency far out of the range of the frequency accuracy defined by 3GPP, since performance may deteriorate due to interference, it is necessary to reduce the frequency error.

As described above, even when the base station having stratum level 0 is the base station of the Wide Area BS class, the frequency error (0.05 ppm) is already contained. Therefore, when the base station having stratum level of 1 or more exists and the relay base station existing in the synchronization path of the multi-hop is operating with the frequency accuracy defined by 3GPP, the base station connected finally cannot guarantee the operation with the frequency accuracy defined by 3GPP.

Subsequently, the second problem of the related art will be described.

In the case of using the multi-hop, the base station of the synchronization destination may not be able to select an optimum synchronization source base station. This is the second problem. The second problem will be described below with reference to FIG. 6.

Figure 6:
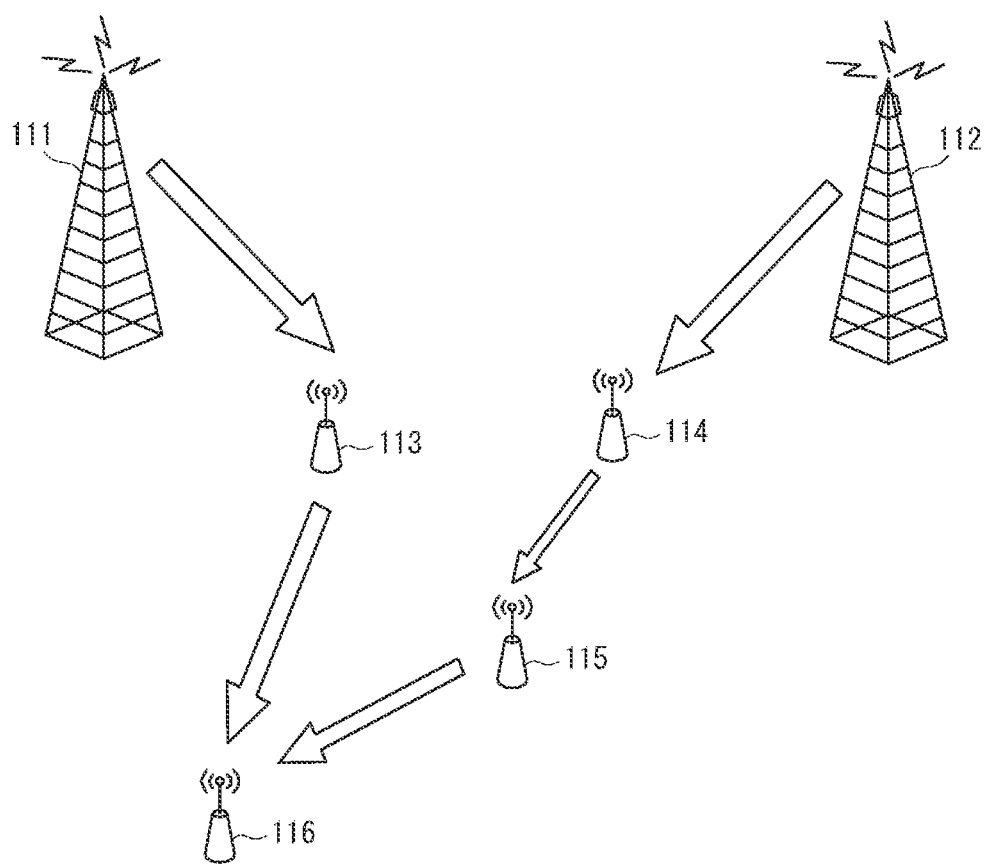
FIG. 6 is a view showing an example of a synchronization scheme of a network listening base.

In the example of FIG. 6, base stations 111 and 112 are gNBs of a Wide Area BS class, and perform GPS synchronization. Further, a base station 113 is a gNB of a Home BS class, and synchronizes with the base station 111 using network listening. In addition, a base station 114 is a gNB of a Local Area BS class, and synchronizes with the base station 112 using network listening. A base station 115 is a gNB of a Local Area BS class, and synchronizes with the base station 114 using network listening.

Here, a base station 116, which is a gNB of a Home BS class, detects the base station 113 and the base station 115 using network listening. Then, the base station 116 acquires stratum level information of the base station 113 and the base station 115 by the method shown in FIG. 5, for example, and confirms that the stratum level of the base station 113 is 1 and the stratum level of the base station 115 is 2.

From comparison of the stratum level of the base station 113 with the stratum level of the base station 115, the stratum level of the base station 113 is lower. Therefore, in the case of Patent Literature 1, the base station 116 selects the base station 113 having the lowest stratum level as the synchronization source base station.

However, the frequency accuracy capable of being guaranteed by each of the base stations 111 to 115 is estimated as follows.

The frequency accuracy of each of the base stations 111 and 112 is 0.05 ppm.

The frequency accuracy of the base station 113 is 0.05 ppm+0.25 ppm=0.30 ppm.

The frequency accuracy of the base station 114 is 0.05 ppm+0.10 ppm=0.15 ppm.

The frequency accuracy of the base station 115 is 0.05 ppm+0.10 ppm+0.10 ppm=0.25 ppm.

From comparison of the frequency accuracy capable of being guaranteed by the base station 113 with the frequency accuracy capable of being guaranteed by the base station 115, the frequency accuracy of the base station 115 is higher (the frequency error is smaller). In other words, the base station 115 has a larger stratum level than the base station 113, but has higher frequency accuracy than the base station 113. Therefore, normally, the base station 116 should select the base station 115 as a synchronization source.

However, in the case of Patent Literature 1, the base station notifies only the stratum level. Therefore, the base station 116 selects the base station 113 having a low stratum level but a low frequency accuracy (large frequency error).

As described above, the guarantee-possible frequency synchronization accuracy when the base station 116 synchronizes with the base stations 114 and 115 of the Local Area BS class using network listening using the multi-hop is different from the guarantee-possible frequency synchronization accuracy when the base station 116 synchronizes with the base station 113 of the Home BS class using network listening. However, in the case of Patent Literature 1, the base station can notify only the stratum level.

Outline of Example Embodiment

In the related art as described above, the base station notifies only the stratum level. Therefore, the related art has the first problem that the base station cannot guarantee the frequency accuracy defined by 3GPP and the second problem that the base station selects the base station having low frequency accuracy as the synchronization source base station.

In an example embodiment to be described below, a first base station notifies a second base station of frequency accuracy information indicating frequency accuracy of the first base station, in a wireless manner or via a backhaul. This enables the second base station to synchronize with an adjacent base station having higher frequency accuracy using network listening, and contributes to solve the first and second problems described above.

For example, the base station of the Local Area BS class or the base station of the Home BS class is also mounted with a crystal oscillator with higher frequency stability (for example, TCXO (Temperature-compensated crystal Oscillator) similar to OCXO (Oven Controlled Crystal Oscillator)), or can guarantee the frequency accuracy within 0.05 ppm by shortening a frequency correction cycle interval.

Therefore, when the base station of the Local Area BS class can guarantee solely the frequency accuracy within 0.05 ppm, the synchronization destination base station, which has acquired frequency accuracy information from such a base station, can select such a base station as a synchronization source base station. At this time, when the synchronization destination base station is the base station of the Local Area BS class that can guarantee solely the frequency accuracy within 0.05 ppm, the synchronization destination base station can guarantee frequency accuracy of 0.1 ppm. As a result, the synchronization destination base station of the Local Area BS class can transmit and receive a radio frame within the range of the frequency accuracy defined by 3GPP.

Further, when the base station of the Home BS class can guarantee solely the frequency accuracy within 0.05 ppm, the synchronization destination base station, which has acquired frequency accuracy information from such a base station, can select such a base station as a synchronization source base station. At this time, when the synchronization destination base station is the base station of the Home BS class that can guarantee solely the frequency accuracy within 0.05 ppm, the synchronization destination base station can guarantee frequency accuracy of 0.1 ppm. As a result, the synchronization destination base station of the Home BS class can transmit and receive a radio frame within the range of the frequency accuracy defined by 3GPP. In addition, even when five base stations of the Home BS class are connected in a string which can guarantee solely the frequency accuracy within 0.05 ppm, since the finally connected fifth base station can guarantee the frequency accuracy of 0.25 ppm, it is possible to transmit and receive a radio frame within the range of the frequency accuracy defined by 3GPP. The first base station and the second base station may be adjacent to each other.

Example Embodiment

An example embodiment of the present disclosure will be described below with reference to the drawings. The following description and drawings are omitted or simplified as appropriate for the sake of clarity of the description.

First, an example of an architecture of a communication system according to the present example embodiment will be described.

Figure 7:
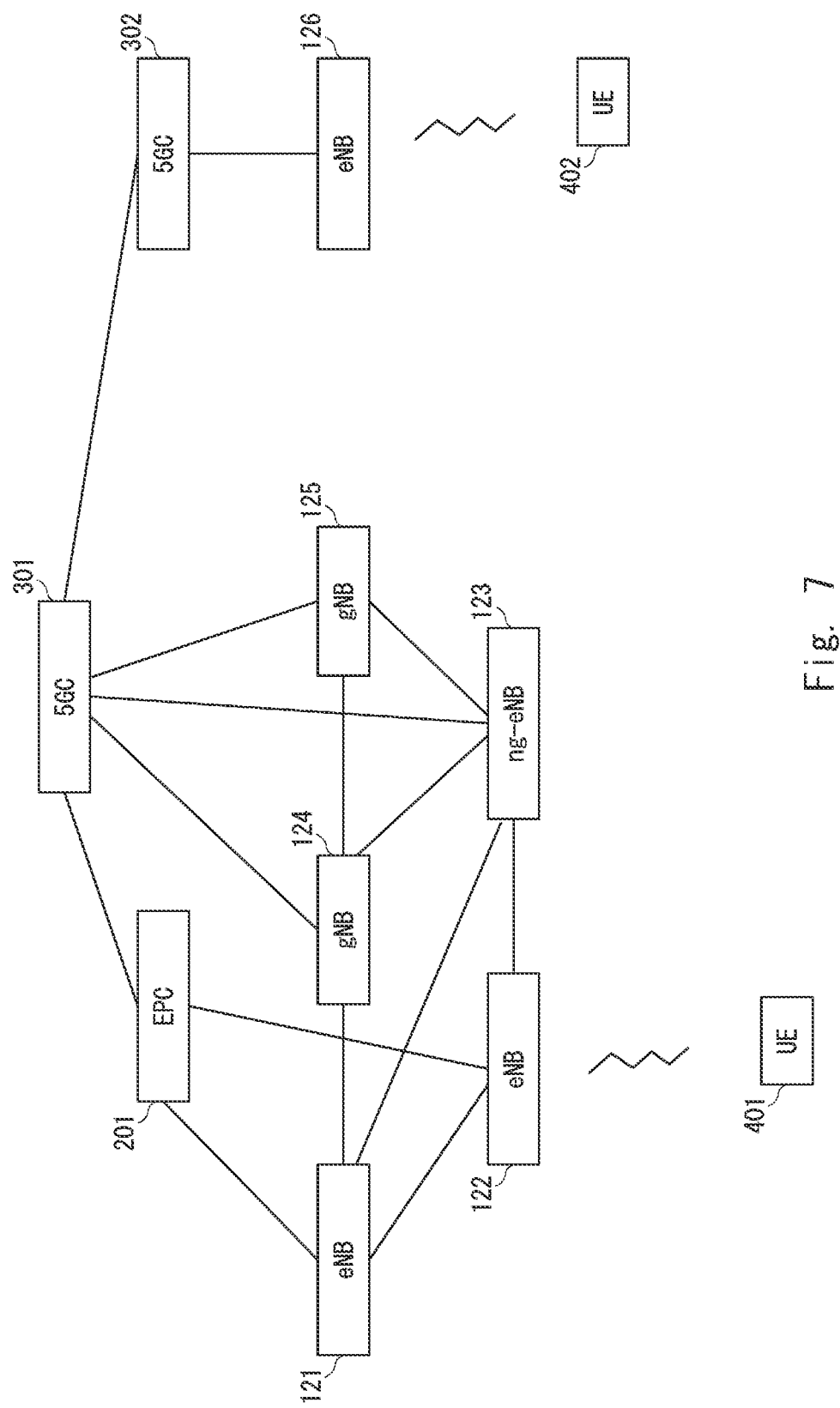
FIG. 7 is a diagram showing an example of an architecture of a communication system according to an example embodiment.

FIG. 7 is a diagram showing an example of the architecture of the communication system of the present example embodiment. FIG. 7 shows an NR/LTE communication system.

As shown in FIG. 7, the communication system according to the present example embodiment includes, for example, eNBs 121 and 122, an ng-eNB 123, gNBs 124, 125, and 126, an EPC 201, 5GCs (5G Core Network) 301 and 302, and UEs 401 and 402.

Each of the eNBs 121 and 122 is a base station that supports the LTE system. Each of the eNBs 121 and 122 may be divided into a CU (Central Unit), a DU (Digital Unit), and an RU (Radio Unit), or may be divided into a C-plane (Control-plane) processing unit and a U-plane (User-plane) processing unit. Further, each of the eNBs 121 and 122 may be a microminiaturized base station such as an HeNB.

The EPC 201 is an LTE system core network. The EPC 201 may be divided into an MME, an S-GW (Serving Gateway), and a P-GW (PDN Gateway).

Each of the eNBs 121 and 122 and the EPC 201 are connected by an S1 interface, and call processing signals and O&M (Operation and Maintenance) processing signals are transmitted and received therebetween.

The eNB 121 and the eNB 122 are connected to an X2 interface, each of the eNBs 121 and 122 and the ng-eNB 123 to be described below are connected by an X2 interface, call processing signals and O&M processing signals such as a handover and EN-DC (E-UTRA (Evolved Universal Terrestrial Radio Access)-NR Dual Connectivity) are transmitted and received. The EN-DC is described in detail in Non Patent Literature 6 (3GPP TS37. 340).

The ng-eNB 123 supports an NG interface with the 5GC 301, but is a base station that can be connected to each of the UEs 401 and 402 by U-plane and C-plane of the LTE (E-UTRA) system. The ng-eNB 123 may be divided into CU, DU, and RU, or may be divided into a C-plane processing unit and a U-plane processing unit. Further, the ng-eNB 123 may be a microminiaturized base station such as a Home ng-eNB.

Each of the gNBs 124, 125, and 126 is a base station that provides a wireless connection in a fifth-generation mobile communication system (5G or NR). Each of the gNBs 124, 125, and 126 may be divided into CU, DU, and RU, or may be divided into a C-plane processing unit and a U-plane processing unit. Further, each of the gNBs 124, 125, and 126 may be a microminiaturized base station such as a Home gNB.

By connection of an Xn interface, each of the gNBs 124 and 125 and the ng-eNB 123 are connected, and the gNB 124 and the gNB 125 are connected, thereby supporting a handover or NE-DC (NR-E-UTRA Dual Connectivity) and NGEN-DC (NG-RAN E-UTRA-NR Dual Connectivity). The NE-DC and the NGEN-DC are described in detail in Non Patent Literature 6 (3GPP TS37. 340).

Each of the 5GCs 301 and 302 is a core network for 5G. Each of the 5GCs 301 and 302 includes an AMF (Access and Mobility management Function) node, an SMF (Session Management Function) node, a UPF (User Plane Function) node, a PCF (Policy Control function) node, an NEF (Network Exposure Function) node, an NRF (Network Repository Function) node, and a UDM (Unified Data Management) node. These nodes are described in detail in Non Patent Literature 7 (3GPP TS23. 501).

By an NG interface, the 5GC 301 and each of the gNBs 124 and 125 are connected, the 5GC 302 and the gNB 126 are connected, and the 5GC 301 and the ng-eNB 123 are connected, thereby call processing signals and O&M processing signals are transmitted and received.

An interface connecting the 5GC 301 and the 5GC 302 is defined by an N14 interface in Non Patent Literature 7 (3GPP TS23. 501), thereby signals are transmitted and received between the 5GCs.

An interface connecting the 5GC 301 and the EPC 201 is defined by an Nx interface in Non Patent Literature 7 (3GPP TS23. 501), thereby, signals for interworking between the 5GC 301 and the EPC 201 are transmitted and received. The Nx interface may be an S10 interface or an N14 interface.

The UE 402 and the gNB 126 are connected using the NR system.

The UE 401 and the eNB 122 are connected using the LTE system.

Each of the UEs 401 and 402 may be a mobile terminal or a smartphone. In addition, each of the UEs 401 and 402 may be a wearable device or an in-vehicle terminal mounted on an automobile.

The above-described connection method between each of the UEs 401 and 402 and the network is an example. Each of the UEs 401 and 402 and the network may be connected by the LTE system alone or the NR system alone, may be connected by MR-DC (Multi-RAT Dual connectivity), or may be connected by DC, which is a combination of the LTE system and the NR system, for example, EN-DC, NGEN-DC, or NE-DC.

Figure 8:
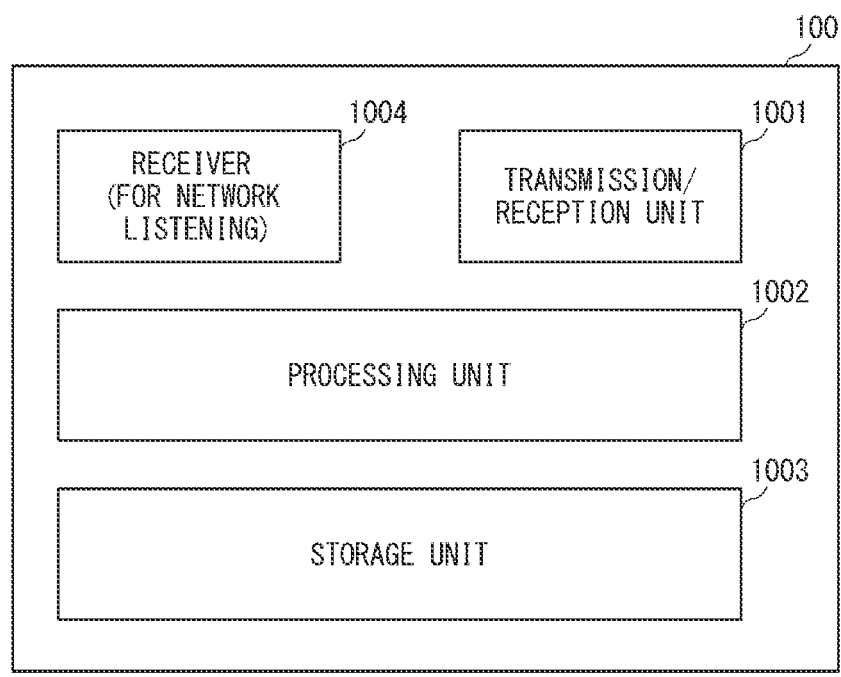
FIG. 8 is a block diagram showing a configuration example of a base state according to the example embodiment.

Subsequently, a configuration example of the base station 100 according to the present example embodiment will be described. FIG. 8 is a block diagram showing a configuration example of the base station 100 according to the present example embodiment. The base station 100 is a concept including the eNBs 101 and 103 and the HeNBs 102, 104, and 105 shown in FIG. 3, the base stations 111 to 116 shown in FIG. 6, and the eNBs 121 and 122, the ng-eNB 123, and the gNBs 124, 125, and 126 shown in FIG. 7.

As shown in FIG. 8, the base station 100 according to the present example embodiment includes a transmission/reception unit 1001, a processing unit 1002, a storage unit 1003, and a receiver 1004 for network listening.

On a wired side, the transmission/reception unit 1001 transmits and receives various signals to/from the EPC 201, the 5GCs 301 and 302, and other base stations. Further, on a wireless side, the transmission/reception unit 1001 transmits and receives various signals to/from the UEs 401 and 402.

The receiver 1004 receives radio waves sent from the surrounding base stations using network listening after tunning the radio waves at frequencies of the surrounding base stations.

The processing unit 1002 performs signal processing, for example, NGAP (NG Application Protocol) processing, XnAP (Xn Application Protocol) processing, S1AP (S1 Application Protocol) processing, and X2AP (X2 Application Protocol) processing, on the signals transmitted and received on the wired side of the transmission/reception unit 1001.

In addition, the processing unit 1002 performs signal processing, for example, RRC (Radio Resource Control) processing, SDAP (Service Data Adaptation Protocol) processing, PDCP (Packet Data Convergence Protocol) processing, RLC (Radio Link Control) processing, MAC (Medium Access Control) processing, and PHY (Physical layer) processing, on the signals transmitted and received on the wireless side of the transmission/reception unit 1001.

Further, the processing unit 1002 measures the radio waves received by the receiver 1004, and performs synchronization processing (frequency synchronization, phase synchronization) based on the measurement result of the radio waves.

In addition, the processing unit 1002 performs call processing such as bearer control or handover, reset processing, alarm processing, statistical information processing, and O&M processing.

The storage unit 1003 is used to store a software module group. The processing unit 1002 can perform the above-described processing by reading and executing the software module group from the storage unit 1003.

An operation of the communication system according to the present example embodiment will be described.

In the network listening disclosed in Non Patent Literature 3 (3GPP TR36. 872), Non Patent Literature 4 (3GPP TR36. 922), and Patent Literature 1, the synchronization with the synchronization source base station is maintained by monitoring of a synchronization signal (SS) and a reference signal (RS) transmitted from the synchronization source base station. Examples of the synchronization signal are a PSS (Primary synchronization signal) and an SSS (Secondary synchronization signal). Examples of the reference signal are a CRS (Cell specific reference signal), a CSI-RS (Channel State Information Reference Signal), and a PRS (Positioning reference signal). However, in Patent Literature 1, only the LTE synchronization scheme is disclosed, but the NR synchronization scheme is not disclosed.

Therefore, a NR network listening based synchronization scheme will be described below.

In the LTE system, the CRS has always been transmitted. On the other hand, in the NR system, the CRS is not specified, and the function of the CRS is realized by a plurality of reference signals (CSI-RS, PT-RS (Phase Tracking Reference signal), and DM-RS (Demodulation-Reference signal)). In the NR system, a synchronization signal and a broadcast channel (PBCH: Physical Broadcast Channel) are defined as one unit (SS/PBCH block), one SS/PBCH block is transmitted in the same direction with a transmission beam, and beam sweeping in which beams are sequentially switched in direction and transmitted is supported for a multi-beam operation. Due to a low frequency band, the beam sweeping is not applied, and a configuration (single beam configuration) is also applicable in which only one SS/PBCH is periodically transmitted in a single beam pattern.

In the NR network listening, the synchronization destination base station tunes the frequency of the receiver 1004 to the frequency of the synchronization source base station and receives radio waves. Then, the synchronization destination base station follows the frequency of the synchronization source base station and performs frequency synchronization using a frequency synthesizer (for example, PLL (Phase Locked Loop) system) configured by a crystal oscillator (OCXO, VCXO (Voltage-Controlled Crystal Oscillator), and TCXO) of the synchronization destination base station itself.

In addition, the synchronization destination base station performs phase synchronization with the PSS and SSS transmitted from the synchronization source base station. Further, the synchronization destination base station detects an index of the SS/PBCH block using the PBCH and the reference signal (PBCH-DMRS: PBCH Demodulation RS) contained in the SS/PBCH block (SSB), and thus can perform phase synchronization. Further, the synchronization destination base station can detect a frame and a slot timing to perform phase synchronization when communicating by a TDD system using the same frequency as the synchronization source base station.

The synchronization destination base station decodes MIB (Master Information Block) and SIB (System Information Block) transmitted as broadcast information from the synchronization source base station. Thereby, the synchronization destination base station obtains information (Cell barred information) and SFN (System. Frame Number) necessary for initial access, and also obtains information necessary for deciding a frame, for example, PDCCH(Physical Downlink Control Channel) information for decoding SIB1. Further, the synchronization destination base station can detect BWP (Bandwidth Part), Cell ID, and a power value of the reference signal on the synchronization source base station side by decoding the SIB. The SIB1 and another broadcast information (for example, SIB2) are transmitted by PDSCH (Physical Downlink Shared Channel) and are scheduled by PDCCH.

In this way, the synchronization destination base station can perform frequency synchronization and phase synchronization on a network listening base with the synchronization source base station by the NR system.

Here, in the case of using the multi-hop, the base station notifies the stratum level in Non Patent Literature 5 (3GPP TS36. 413) and Patent Literature 1. However, the stratum level is to notify the number of relay base stations existing in the synchronization path between the base station performing GPS synchronization and the own base station, and is not to notify the frequency accuracy (frequency error) that can be guaranteed by the own base station.

Therefore, according to the related art, there is the first problem that the synchronization destination base station cannot guarantee the frequency accuracy defined by 3GPP.

Further, according to the related art, there is the second problem that the synchronization destination base station selects the base station having a low stratum level but low frequency accuracy (larger frequency error) as the synchronization source base station.

In order to contribute to the solution of the first and second problems described above, according to the present example embodiment, the method is proposed that the adjacent base station adjacent to any base station notifies any base station of the frequency accuracy information (frequency error information) indicating the frequency accuracy (frequency error) of the adjacent base station, in the wireless manner or via the backhaul.

Figure 9:
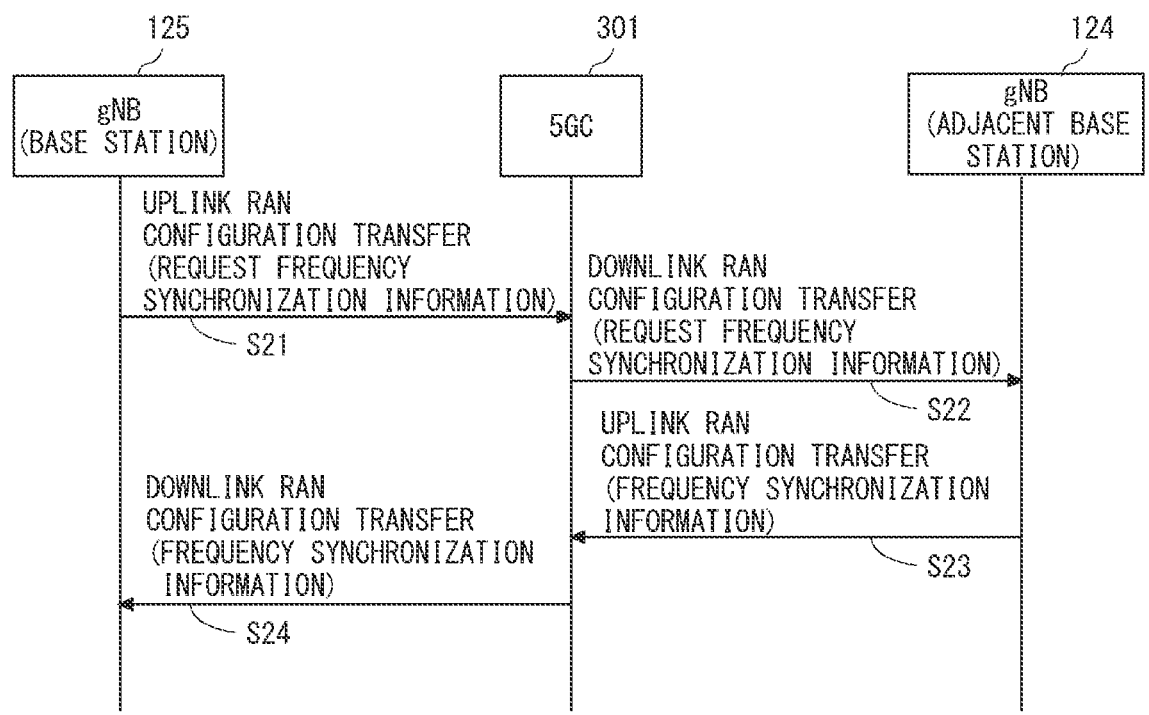
FIG. 9 is a sequence diagram showing an example of a method of notifying frequency accuracy information via a backhaul between base stations according to the example embodiment.

Hereinafter, a description will be given with respect to an example of a method of notifying the frequency accuracy information between the base stations according to the present example embodiment via the backhaul. FIG. 9 is a sequence diagram showing an example of a method of notifying the frequency accuracy information between the base stations according to the present example embodiment via the backhaul. FIG. 9 shows an example in which the base station is the gNB 125 shown in FIG. 7 which is an NG RAN node (gNB or ng-eNB) and the adjacent base station is the gNB 124 shown in FIG. 7 which is an NG RAN node. In addition, FIG. 9 shows an example in which the adjacent base station notifies frequency accuracy information of the adjacent base station using an UPLINK RAN CONFIGURATION TRANSFER message and a DOWNLINK RAN CONFIGURATION TRANSFER message of an NGAP protocol.

The gNB 125 has a function of periodically performing network listening during power-ON or during starting of a cell. Here, it is assumed that the gNB 125 detects the gNB 124 as an adjacent base station using network listening.

As shown in FIG. 9, when the gNB 124 is detected by the network listening, the gNB 125 extracts routing information including Cell-ID, PLMN (Public Land Mobile Network)-ID, and TAC (Tracking Area Code) information of the gNB 124, based on the broadcast information transmitted from the gNB 124. Then, the gNB 125 sets the routing information of the gNB 124 to a target ID of the UPLINK RAN CONFIGURATION TRANSFER message, transmits the UPLINK RAN CONFIGURATION TRANSFER message to the 5GC 301, and request frequency accuracy information of the gNB 124 (step S21).

The 5GC 301 transmits the DOWNLINK RAN CONFIGURATION TRANSFER message to the gNB 124 based on the routing information of gNB 124 set to the UPLINK RAN CONFIGURATION TRANSFER message, and inquires about the frequency accuracy information of the gNB 124 (step S22).

The gNB 124 sets the frequency accuracy information capable of being guaranteed by the gNB 124 to the UPLINK RAN CONFIGURATION TRANSFER message, and transmits the UPLINK RAN CONFIGURATION TRANSFER message to the 5GC 301 (step S23).

The 5GC 301 transmits the DOWNLINK RAN CONFIGURATION TRANSFER message to the gNB 125, and notifies the gNB 125 of the frequency accuracy information of the gNB 124 (step S24).

The gNB 124 may notify the gNB 125 of not only the frequency accuracy information of the gNB 124 but also the stratum level information indicating the stratum level of the gNB 124 or synchronization status information indicating a synchronization status of the gNB 124.

Further, the frequency accuracy information of the gNB 124 may be that the frequency accuracy capable of being guaranteed by the synchronization source gNB 124 is defined as ppm, or may be that the frequency accuracy is defined as another unit such as ppb (parts per billion).

Subsequently, a description will be given with respect to an example of the frequency accuracy information regarding each of the base stations 111 to 115 shown in FIG. 6. FIG. 10 is a view showing an example of a list of information regarding each of the base stations 111 to 115 shown in FIG. 6. FIG. 10 shows information on a base station class, a stratum level, a synchronization status, a synchronization source, frequency accuracy, cumulative frequency accuracy (cumulative frequency error), and a synchronization scheme for each of the base stations 111 to 115. Each of the base stations 111 to 115 stores and retains at least information regarding the own base station among the information shown in FIG. 10 in the storage unit 1003. Further, each of the base stations 111 to 115 may also acquire information regarding the adjacent base information, which is detected by the network listening, from the adjacent base station among the information shown in FIG. 10 and retain the acquired information.

The base station class is defined as a Wide Area BS, a Medium Range BS, a Local Area BS, and a Home BS.

The stratum level indicates the number of hops from the base station that performs GPS synchronization. The stratum level makes it possible to notify the number of relay base stations existing in the synchronization path between the base station performing GPS synchronization and the own base station. The stratum level is defined by an integer equal to or greater than 0.

The synchronization status is defined as an in-sync status, an out-of-sync status, a holdover status, or the like.

The synchronization source is GPS when the synchronization scheme of the base station is GPS synchronization. On the other hand, when the synchronization scheme of the base station is network listening based synchronization, the synchronization source is a synchronization source base station.

The frequency accuracy is frequency accuracy that can be guaranteed solely by the base station.

In the case of a base station that performs GPS synchronization, the cumulative frequency accuracy (cumulative frequency error) is frequency accuracy (frequency error) that can be guaranteed solely by the base station. On the other hand, in the case of a base station that performs the network listening based synchronization, the cumulative frequency accuracy is obtained by addition of frequency accuracy capable of being guaranteed solely by the base station, frequency accuracy capable of being guaranteed solely by an intermediate base station existing in a synchronization path between the base station and a base station that performs GPS synchronization, and frequency accuracy capable of being guaranteed solely by the base station that performs GPS synchronization. This is because, in the case of network listening based frequency synchronization, absolute frequency accuracy of a base station depends on the frequency accuracy of the intermediate base station existing in the synchronization path between the base station and a base station that performs GPS synchronization and the frequency accuracy of the base station that performs GPS synchronization. In a case of a base station having stratum level 1, since an intermediate base station does not exist in a synchronization path between the base station and a base station that performs GPS synchronization, the addition of the frequency accuracy of the intermediate base station is not necessary.

For example, the base station 113 uses a network listening based synchronization scheme. The base station 113 acquires information on cumulative frequency accuracy of the base station 111 as frequency accuracy information of the base station 111 using, for example, the method shown in FIG. 9, from the base station 111 detected as an adjacent base station using network listening. Here, since the cumulative frequency accuracy of the base station 111 is 0.05 ppm and the frequency accuracy capable of being guaranteed solely by the base station 113 is 0.25 ppm, the cumulative frequency accuracy of the base station 113 is 0.05 ppm+0.25 ppm=0.3 ppm. The base station 113 synchronizes with the base station 111 using network listening.

In addition, the base station 115 uses a network listening based synchronization scheme. The base station 115 acquires information on cumulative frequency accuracy of the base station 114 as frequency accuracy information of the base station 114 using, for example, the method shown in FIG. 9, from the base station 114 detected as an adjacent base station using network listening. Here, since the cumulative frequency accuracy of the base station 114 is 0.15 ppm and the frequency accuracy capable of being guaranteed solely by the base station 115 is 0.1 ppm, the cumulative frequency accuracy of the base station 115 is 0.15 ppm+0.1 ppm=0.25 ppm. The base station 115 synchronizes with the base station 114 using network listening.

Further, the base station 116 uses a network listening based synchronization scheme. It is assumed that the base station 116 detects the base station 113 and the base station 115 as adjacent base stations using network listening.

In this case, the base station 116 acquires cumulative frequency accuracy information of each of the base station 113 and the base station 115 using, for example, the method shown in FIG. 9, from each of the base station 113 and the base station 115.

When the base station 116 becomes a synchronization destination base station for network listening, either the base station 113 or the base station 115 is selected as a synchronization source base station.

In Non Patent Literature 5 (3GPP TS36. 413) and Patent Literature 1, the base station has acquired stratum level information and synchronization status information from an adjacent base station detected using network listening. Therefore, the base station represents only the stratum level and the synchronization status of the adjacent base station.

Therefore, in the case of Non Patent Literature 5 (3GPP TS36. 413) and Patent Literature 1, the synchronization destination base station 116 may select the base station 113 having a lower stratum level from the base station 113 and the base station 115 as a synchronization source base station. However, the base station 115 out of the base station 113 and the base station 115 has higher frequency accuracy (smaller frequency error). Therefore, originally, the base station 115 is a base station that should be selected as a synchronization source by the synchronization destination base station 116.

On the other hand, in the present example embodiment, the synchronization destination base station 116 acquires cumulative frequency accuracy information as frequency accuracy information from the base station 113 and the base station 115 detected as adjacent base stations using network listening. Thereby, when the synchronization destination base station 116 performs synchronization using network listening by using a multi-hop, it can select the base station 115 having higher cumulative frequency accuracy (smaller cumulative frequency error) as a synchronization source base station.

Figure 11:
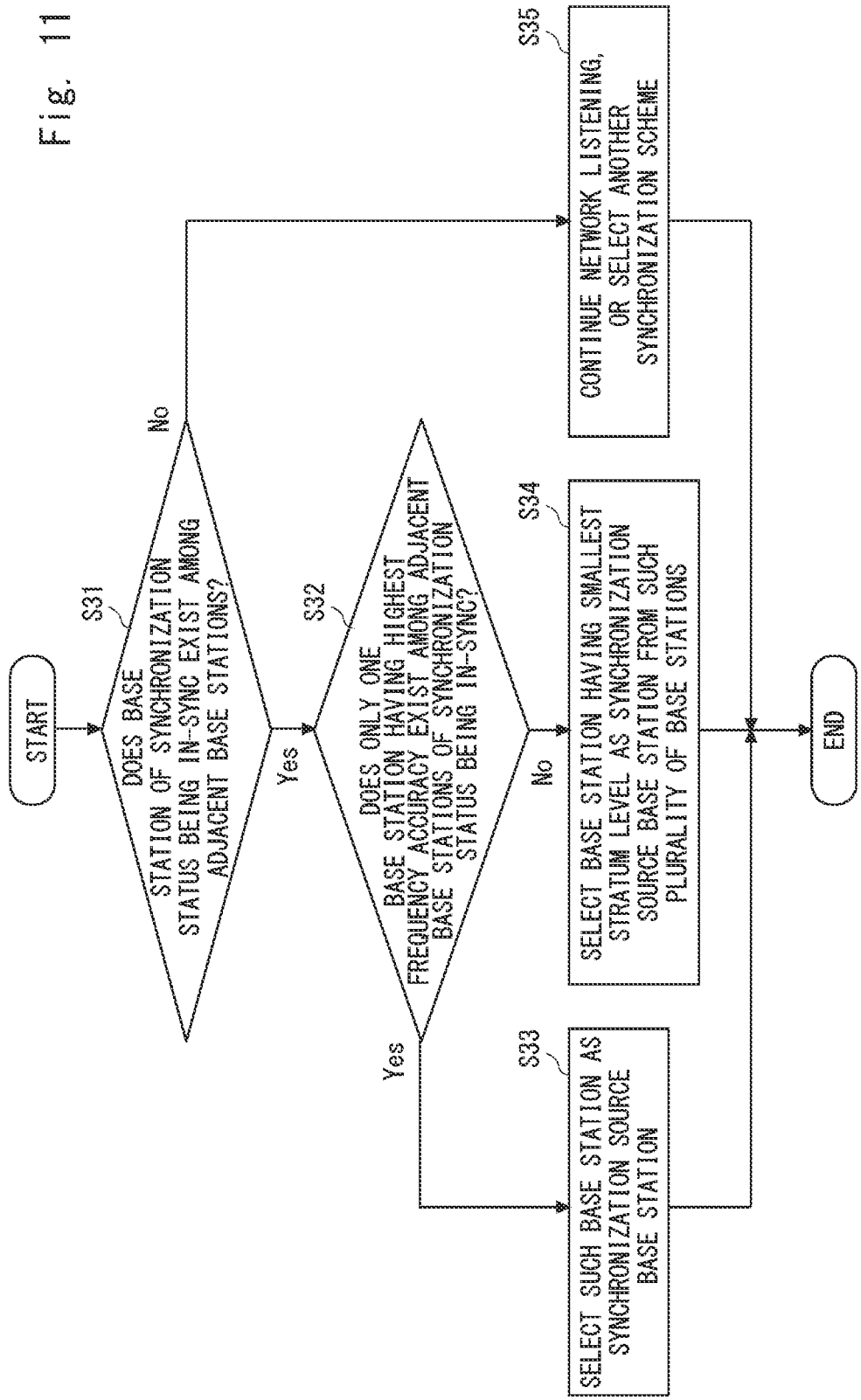
FIG. 11 is a flowchart showing an example of a process flow of processing in which a synchronization destination base station according to the example embodiment selects a synchronization source base station.

Subsequently, a description will be given with respect to an example of a process in which the synchronization destination base station 100 selects a synchronization source base station. FIG. 11 is a flowchart showing an example of a processing flow of a process in which the synchronization destination base station 100 selects a synchronization source base station. It is assumed that a processing flow of FIG. 11 starts at a selection timing at which the synchronization destination base station 100 selects the synchronization source base station after acquiring the frequency accuracy information from the adjacent base station. The selection timing is a timing at which the frequency accuracy information is acquired from the adjacent base station, and a periodic timing. In FIG. 11, it is assumed that the synchronization destination base station 100 also acquires synchronization status information and stratum level information as well as the frequency accuracy information from the adjacent base station.

As shown in FIG. 11, the synchronization destination base station 100 determines whether a base station of synchronization status being in-sync exists among the adjacent base stations (step S31).

When the base station of the synchronization status being in-sync exists (Yes in step S31), the synchronization destination base station 100 determines whether only one base station having highest frequency accuracy (smallest frequency error) exists among the base stations of the synchronization status being in-sync (step S32).

When only one base station having highest frequency accuracy exists among the base stations of the synchronization status being in-sync (Yes in step S32), the synchronization destination base station 100 selects such a base station as a synchronization source base station (step S33).

Further, when a plurality of base stations having highest frequency accuracy exist among the base stations of the synchronization status being in-sync (No in step S32), the synchronization destination base station 100 selects a base station having the smallest stratum level, as a synchronization source base station, from such a plurality of base stations (step S34). When a plurality of base stations having the smallest stratum level exist among such a plurality of base stations, the synchronization destination base station 100 may select, for example, any base station as a synchronization source base station from the plurality of base stations.

When the base station of the synchronization status being in-sync does not exist among the adjacent base stations (No in step S31), the synchronization destination base station 100 continues network listening, or selects another synchronization scheme (step S35).

It is assumed that the logic of FIG. 11 is applied to the case of FIG. 10, the base station 116 in FIG. 6 becomes the synchronization destination, and the synchronization source base station is selected. All the base stations 113 and 115, which are adjacent base stations of the synchronization destination base station 116, have a synchronization status being in-sync. Out of the base stations 113 and 115, the base station 115 is a base station having higher cumulative frequency accuracy (smaller cumulative frequency error). Therefore, the synchronization destination base station 116 selects not the base station 113 but the base station 115 as the synchronization source base station having higher cumulative frequency accuracy.

The description has been given in the case of FIG. 10 assuming that the frequency accuracy capable of being guaranteed solely by the base stations 111 to 115 is the same as the frequency accuracy defined by 3GPP. However, depending on the crystal oscillator of the base stations 111 to 115 and the frequency correction cycle interval of the crystal oscillator, the frequency accuracy capable of being guaranteed solely by the base stations 111 to 115 can be improved.

FIG. 12 is a view showing an example of a list of information regarding each of the base stations 111 to 115 when the base stations 111 to 115 having higher frequency accuracy (smaller frequency error) are used as the base stations 111 to 115 shown in FIG. 6.

In the example of FIG. 12, the frequency accuracy capable of being guaranteed solely by each of the base stations 111 and 112 of the Wide Area BS class is 0.02 ppm, the frequency accuracy capable of being guaranteed solely by each of the base stations 114 and 115 of the Local Area BS class is 0.05 ppm, and the frequency accuracy capable of being guaranteed solely by the base station 113 of the Home BS class is 0.12 ppm.

Here, the base station 116 of the Home BS class detects the base station 113 and the base station 115 as adjacent base stations using network listening, and acquires cumulative frequency accuracy information of the base station 113 and the base station 115 from the base station 113 and the base station 115 using the method in FIG. 9, for example.

When the base station 116 is the synchronization destination base station for network listening, either the base station 113 or the base station 115 is selected as the synchronization source base station.

From comparison of the cumulative frequency accuracy of the base station 113 with the cumulative frequency accuracy of the base station 115, since the base station 115 has higher cumulative frequency accuracy (smaller cumulative frequency error), the synchronization destination base station 116 can select the base station 115 as the synchronization source base station. At this time, the cumulative frequency accuracy of the synchronization source base station 115 is 0.12 ppm, and the frequency accuracy (frequency error) capable of being guaranteed solely by the synchronization destination base station 116 is 0.12 ppm. Therefore, finally, the cumulative frequency accuracy of the synchronization destination base station 116 is 0.12 ppm+0.12 ppm=0.24 ppm. Accordingly, the synchronization destination base station 116 can suppress the frequency accuracy within the range of 0.25 ppm which is the frequency accuracy of the Home BS class defined by 3GPP.

In Patent Literature 1, the synchronization destination base station selects the synchronization source base station using only the stratum level. For this reason, in the case of Patent Literature 1, the synchronization destination base station 116 selects the base station 113 as the synchronization source base station. At this time, the cumulative frequency accuracy of the synchronization source base station 113 is 0.14 ppm, and the frequency accuracy (frequency error) capable of being guaranteed solely by the synchronization destination base station 116 is 0.12 ppm. For this reason, finally, the cumulative frequency accuracy of the synchronization destination base station 116 is 0.14 ppm+0.12 ppm=0.26 ppm. Accordingly, the frequency accuracy of the synchronization destination base station 116 exceeds 0.25 ppm which is the frequency accuracy of the Home BS class defined by 3GPP. As a result, interference and transmission/reception error may occur, and communication quality may not be maintained.

According to the present example embodiment as described above, the adjacent base station adjacent to the base station notifies the base station of the frequency accuracy information indicating the frequency accuracy of the adjacent base station, in the wireless manner or via the backhaul. For this reason, the base station can synchronize with the adjacent base station having higher frequency accuracy using network listening. This can contribute to the solution of the first problem that the base station cannot guarantee the frequency accuracy defined by 3GPP and the second problem that the base station selects the base station having low frequency accuracy as the synchronization source base station.

Another Example Embodiment

In FIG. 9, as the example of the method of notifying the frequency accuracy information between the base stations via the backhaul, the example has been described that uses, via 5GC, the UPLINK RAN CONFIGURATION TRANSFER message and the DOWNLINK RAN CONFIGURATION TRANSFER message of the NGAP protocol defined in Non Patent Literature 8 (3GPP TS38. 413). However, the protocol message of the NGAP protocol is not limited to these messages, and other protocol messages may be used.

Further, the frequency accuracy information may be directly notified between the base stations using a protocol message of an XnAP protocol defined in Non Patent Literature 9 (3GPP TS38. 423).

There is a case where a base station supporting the NR system synchronizes with a base station supporting the LTE system using network listening. Further, there is a case where a base station supporting the LTE system synchronizes with a base station supporting the NR system using network listening. In addition, there is a case where a base station supporting the LTE system synchronizes with a base station supporting the LTE system using network listening. Further, there is a case where a base station of different radio access technology (RAT) synchronizes with a base station of W-CDMA (Wideband Code Division Multiple Access), CDMA, and GSM (registered trademark) (global system for mobile communications) using network listening. As described above, in the case of performing the synchronization between different RATs using network listening, frequency accuracy information may be transferred by an interface between different RATs, an interface between 5GC and 5GC, an interface between EPC and EPC, an interface between EPC and 5GC (S10 interface or N14 interface), an interface between different PLMNs, an S1 interface, or an X2 interface.

Here, a transfer method of transferring frequency accuracy information in the case of performing synchronization between different RATs using network listening will be supplemented.

For example, when the base station supporting the NR system synchronizes with the base station supporting the LTE system using network listening, the base station of the NR system needs to inquire the base station of the LTE system of frequency accuracy information via 5GC and EPC.

The synchronization destination base station of the NR system sets RIM Information to request the frequency accuracy information of the base station of the LTE system and transmits an UPLINK RIM INFORMATION TRANSFER message of an NGAP protocol to 5GC. A Global RAN Node ID and a TAI are set in a Target RAN ID of an UPLINK RIM INFORMATION TRANSFER message. An eNB ID and a cell ID of the synchronization destination base station of the LTE system are set in the Global RAN Node ID. The 5GC confirms the TAI, and performs routing of the message on the EPC bases on TAI information. The EPC confirms the Target RAN ID, specifies a base station (eNB) of the LTE system which is a routing destination, and transmits an MME DIRECT INFORMATION TRANSFER message. The base station of the LTE system receiving the MME DIRECT INFORMATION TRANSFER message confirms the frequency accuracy information requested by the RIM Information, and sets the frequency accuracy information in RIM Information of an ENB DIRECT INFORMATION TRANSFER message. The EPC specifies the 5GC based on the TAI information of the transmission destination of the ENB DIRECT INFORMATION TRANSFER message, and performs routing of the message. The 5GC specifies the base station of the NR system by the Global RAN Node ID of the message transmission destination, and performs routing of the DOWNLINK RIM INFORMATION TRANSFER message on the synchronization destination base station of the NR system. Thus, the synchronization destination base station of the NR system can acquire the frequency accuracy information of the base station of the LTE system.

Even when the base station of the LTE system synchronizes with the base station of the NR system using network listening, it is possible to acquire the frequency accuracy information of the base station of the NR system as described above. Further, even when the base station of the LTE system synchronizes with the base station of the NR system using network listening or when the base station of the NR system synchronizes with the base station of different RATs such as W-CDMA, CDMA, and GSM using network listening, it is possible to acquire the frequency accuracy information of the adjacent base station, which is the synchronization source, via the core network by the routing system as described above.

Even when the base station is divided into CU, DU, and RU, the frequency accuracy information may be transferred using any combination of interfaces, for example, CU-CU, CU-DU, DU-RU, DU-DU, or RU-RU.

In addition, the frequency accuracy information may be notified wirelessly between the base stations. As a method of notifying wirelessly the frequency accuracy information, the frequency accuracy information may be notified to the base station from the adjacent base station by broadcast information due to the RRC protocol, or the frequency accuracy information may be notified by a lower layer protocol such as MAC or PHY. Further, the frequency accuracy information may be notified via a maintenance monitoring device (O&M device) of each of the base station and the adjacent base station.

In the example of FIG. 9, the base station requests the frequency accuracy information from the adjacent base station, and the adjacent base station notifies the base station of the frequency accuracy information as a response to the request, but the present invention is not limited thereto. For example, when the frequency accuracy information (for example, cumulative frequency accuracy information) of the synchronization source base station is updated in a situation where the synchronization has already been performed using network listening, the frequency accuracy information of the synchronization destination base station also needs to be updated. Therefore, when the frequency accuracy information of the synchronization source base station is updated, the updated frequency accuracy information of the synchronization source base station may be notified to the synchronization destination base station from the synchronization source base station in a wireless manner or via a backhaul.

For example, when the synchronization status of the synchronization source base station becomes an out-of-sync status, a base station synchronizing with the base station needs to synchronize with another base station, so that a change occurs in a synchronization path in multi-hop. When the change occurs in the synchronization path in multi-hop, the frequency accuracy information of the synchronization destination base station may also change. Further, even when the synchronization source base station switches the synchronization scheme from GPS synchronization to PTP synchronization or synchronization by SyncE, the frequency accuracy information of the synchronization destination base station may also change. In such a case, the updated frequency accuracy information of the synchronization source base station may be notified from the synchronization source base station to the synchronization destination base station in a wireless manner or via a backhaul.

In the example embodiment described above, the method has been described in which the synchronization destination base station selects the synchronization source base station using the frequency accuracy information (for example, cumulative frequency accuracy information), the stratum level information, and the synchronization status information of the adjacent base station, the present invention is not limited thereto.

For example, the synchronization destination base station may select the synchronization source base station using only the frequency accuracy information of the adjacent base station.

Further, the synchronization destination base station may select the synchronization source base station by further combining the frequency accuracy information, the stratum level information, and the synchronization status information of the adjacent base station with radio quality information (for example, SS (Synchronization Signal)-RSRP (Reference Signal Receive Power), SS-RSRQ (Reference Signal Received Quality), SS-SINR (Signal to Interference plus Noise Ratio), CSI-RSRP, CSI-RSRQ, CSI-SINR, RSRP, and RSRQ) of the adjacent base station. For example, the synchronization destination base station excludes base stations with extremely low RSRP and RSRQ, and can select a base station having the highest cumulative frequency accuracy (smallest cumulative frequency error) as the synchronization source base station, from the target base stations.

In the example embodiment described above, the synchronization destination base station acquires the cumulative frequency accuracy information of the adjacent base station as the frequency accuracy information of the adjacent base station, but the present invention is not limited thereto. Another example of frequency accuracy information of the adjacent base station will be described below.

For example, the synchronization destination base station may acquire the base station class (Wide Area BS or Home BS) of the adjacent base station as the frequency accuracy information of the adjacent base station, and may obtain the frequency accuracy of the adjacent base station from the base station class of the adjacent base station using the information shown in FIG. 1. However, the frequency accuracy of the adjacent base station can be obtained from the base station class of the adjacent base station only when the stratum level of the adjacent base station is 0. When the stratum level of the adjacent base station is 1, the synchronization destination base station needs to further acquire the base station class of the base station that performs GPS synchronization. In addition, when the stratum level of the adjacent base station is 2 or more, the synchronization destination base station needs to further acquire the base station class of the intermediate base station existing in the synchronization path between the adjacent base station and the base station that performs GPS synchronization.

In Patent Literature 1, the stratum level is to notify the number of relay base stations existing in the synchronization path between the base station performing GPS synchronization and the own base station, and the stratum level itself is not to guarantee the frequency accuracy.

Therefore, as a stratum level, another example embodiment proposes a stratum level weighted by the frequency accuracy capable of being guaranteed solely by each of the base stations.

For example, the stratum level is assigned in units of 0.05 ppm. In other words, the stratum level 1 is assigned to the base station of which frequency accuracy is within 0.5 ppm that can be guaranteed solely. The stratum level 2 is assigned to the base station of which frequency accuracy is within 0.10 ppm that can be guaranteed solely. The stratum level 3 is assigned to the base station of which frequency accuracy is within 0.15 ppm that can be guaranteed solely. The stratum level 4 is assigned to the base station of which frequency accuracy is within 0.20 ppm that can be guaranteed solely. In addition, the stratum level 5 is assigned to the base station of which frequency accuracy is within 0.25 ppm that can be guaranteed solely.

FIG. 13 is a view showing an example of a list of information regarding each of the base stations 111 to 115 shown in FIG. 6 when the stratum level defined as described above is used. FIG. 13 shows a cumulative stratum level instead of the cumulative frequency accuracy in FIG. 10. Further, the definition of the stratum level is also different from that in FIG. 10.

The stratum level is a stratum level weighted by the frequency accuracy capable of being guaranteed solely by the base station. The stratum level is defined as 1 to 5.

In the case of the base station that performs the GPS synchronization, the cumulative stratum level is the stratum level of such a base station. On the other hand, in the case of the base station that performs network listening based synchronization, the cumulative stratum level is obtained by addition of the stratum level of such a base station, the stratum level of the intermediate base station existing in the synchronization path between such a base station and the base station that performs GPS synchronization, and the stratum level of the base station that performs GPS synchronization. In the case of the base station having stratum level 1, since an intermediate base station does not exist in a synchronization path between such a base station and the base station that performs GPS synchronization, the addition of the stratum level of the intermediate base station is not necessary.

In the case of FIG. 13 each of the base stations 111 and 112 has stratum level 1 because of having the frequency accuracy of 0.02 ppm. In addition, each of the base stations 111 and 112 has both the cumulative stratum level and the stratum level being 1 because of performing GPS synchronization.

The base station 113 has the frequency error of 0.12 ppm, and thus is in stratum level 3. Since the base station 113 synchronizes with the base station 111 using network listening, the cumulative stratum level is stratum level 4 obtained by adding stratum level 3 of the base station 113 to cumulative stratum level 1 of the base station 111.

The base station 114 has the frequency accuracy of 0.05 ppm, and thus is in stratum level 1. Since the base station 114 synchronizes with the base station 112 using network listening, the cumulative stratum level is stratum level 2 obtained by adding stratum level 1 of the base station 114 to cumulative stratum level 1 of the base station 112.

The base station 115 has the frequency accuracy of 0.05 ppm, and thus is in stratum level 1. Since the base station 115 synchronizes with the base station 114 using network listening, the cumulative stratum level is stratum level 3 obtained by adding stratum level 1 of the base station 115 to cumulative stratum level 2 of the base station 114.

It is assumed that the base station 116 detects, as adjacent base stations, the base station 113 and the base station 115 using network listening.

In this case, the base station 116 acquires, as the frequency accuracy information of the base station 113 and the base station 115, cumulative stratum level information of the base station 113 and the base station 115 from the base station 113 and the base station 115 by the method in FIG. 9, for example.

When the base station 116 becomes a synchronization destination base station for network listening, either the base station 113 or the base station 115 is selected as a synchronization source base station.

From comparison of the cumulative stratum level of the base station 113 with the cumulative stratum level of the base station 115, the base station 115 has a smaller cumulative stratum level (higher frequency accuracy). For this reason, the synchronization destination base station 116 selects the base station 115 as the synchronization source base station and synchronizes with the base station 115 using network listening. This makes it possible to obtain synchronization with high frequency accuracy.

Figure 14:
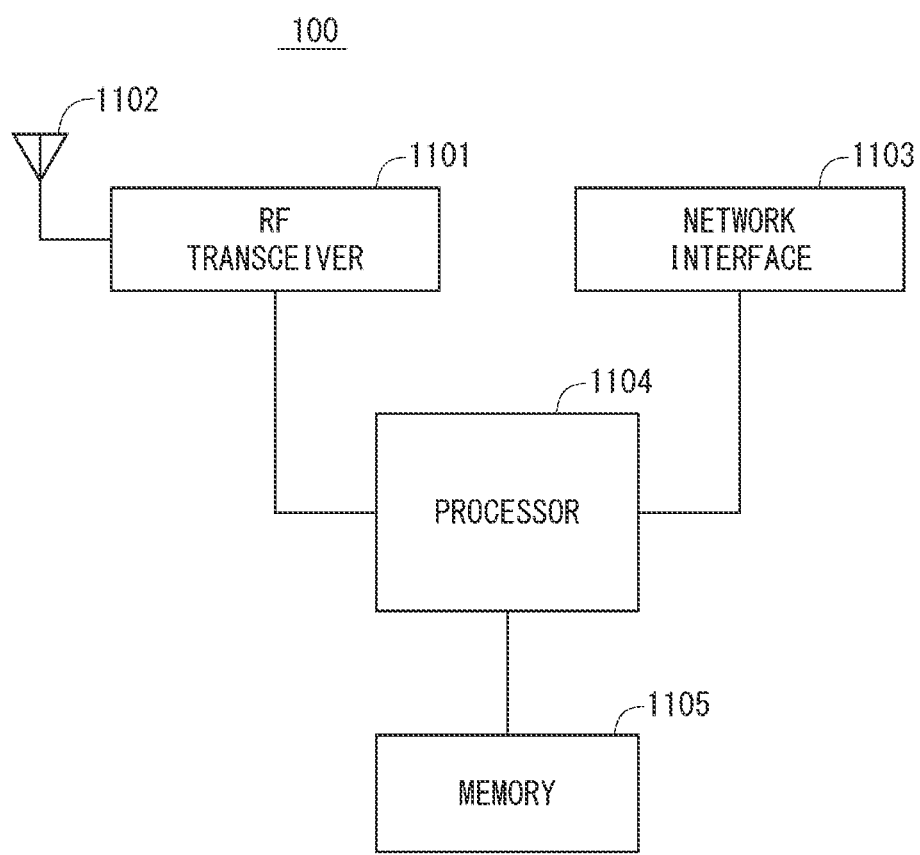
FIG. 14 is a block diagram showing a hardware configuration example of the base station according to the example embodiment.

Subsequently, a description will be given with respect to a hardware configuration example of the base station 100 described in the above-described example embodiment. FIG. 14 is a block diagram showing a hardware configuration example of the base station 100.

As shown in FIG. 14, the base station 100 includes an RF (Radio Frequency) transceiver 1101, a network interface 1103, a processor 1104, and a memory 1105. For example, the transmission/reception unit 1001 shown in FIG. 8 is realized by the RF transceiver 1101 and the network interface 1103. The processing unit 1002 shown in FIG. 8 is realized by the processor 1104. The storage unit 1003 shown in FIG. 8 is realized by the memory 1105. The receiver 1004 for network listening shown in FIG. 8 is realized by the RF transceiver 1101.

The RF transceiver 1101 performs analog RF signal processing to communicate with the UEs 401 and 402 and to perform network listening. The RF transceiver 1101 may include a plurality of transceivers. The RF transceiver 1101 is couped to the antenna 1102 and the processor 1104. The RF transceiver 1101 receives modulated symbol data (or OFDM symbol data) from the processor 1104, generates a transmission RF signal, and supplies the generated transmission RF signal to the antenna 1102. Further, the RF transceiver 1101 generates a baseband reception signal based on a reception RF signal received by the antenna 1102 and supplies this signal to the processor 1104.

The network interface 1103 is used to communicate with a network node (for example, another core network node). The network interface 1103 may include, for example, a network interface card (NIC) conforming to the IEEE 802.3 series.

The processor 1104 performs U-plane processing and C-plane processing including digital baseband signal processing for radio communication. For example, in the case of LTE or 5G, the digital baseband signal processing performed by the processor 1104 may include signal processing of MAC layer and PHY layer.

The processor 1104 may include a plurality of processors. The processor 1104 may include, for example, a modem-processor (for example, DSP) that performs the digital baseband signal processing, and a protocol-stack-processor (for example, CPU or MPU) that performs C-plane processing.

The memory 1105 is configured by a combination of a volatile memory and a nonvolatile memory. The memory 1105 may include a plurality of physically independent memory devices. The volatile memory is, for example, a static random access memory (SRAM), a dynamic RAM (DRAM), or a combination thereof. The nonvolatile memory is, for example, a mask read only memory (MROM), an electrically erasable programmable ROM (EEPROM), a flash memory, a hard disk drive, or a combination thereof. The memory 1105 may include a storage located apart from the processor 1104. In this case, the processor 1104 may access the memory 1105 through the network interface 1103 or an I/O interface (not shown).

The memory 1105 may store software modules (computer programs) including instructions and data to perform processing performed by the base station 100 described in the above-described example embodiments. In some implementations, the processor 1104 may be configured to read and execute the software modules from the memory 1105, thereby performing the processing of the base station 100 described in the above-described example embodiments.

In the above example, these programs may be stored in various types of non-transitory computer readable media and thereby supplied to computers. The non-transitory computer readable media includes various types of tangible storage media. Examples of the non-transitory computer readable media include a magnetic recording medium, a magneto-optic recording medium (such as a magneto-optic disk), a CD-ROM (Read Only Memory), a CD-R, a CD-R/W, a semiconductor memory, and a flash ROM, RAM (Random Access Memory). Examples of the magnetic recording medium may include a flexible disk, a magnetic tape, and a hard disk drive. Examples of the semiconductor memory may include a mask ROM, a PROM (Programmable ROM), an EPROM (Erasable PROM), a flash ROM, and a RAM (Random Access Memory). These programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

Figure 15:
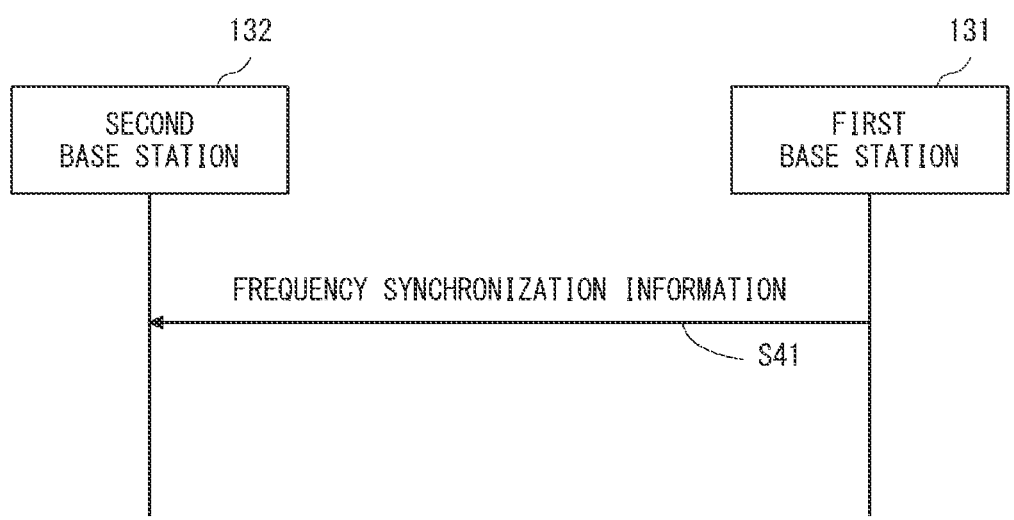
FIG. 15 is a sequence diagram showing an example of processing of a base station to be executed by a processor shown in FIG. 14.

Here, an example of processing of the base station 100 executed by the processor 1104 will be described. FIG. 15 is a sequence diagram showing an example of processing of the base station 100 executed by the processor 1104. In FIG. 15, a first base station 131 is a base station which is a synchronization destination for network listening, and a second base station 132 is a base station which is a synchronization source for network listening.

As shown in FIG. 15, for example, the processor 1104 provided in the first base station 131 is configured to notify the second base station 132 adjacent to the first base station 131 of frequency accuracy information indicating frequency accuracy of the first base station 131 in a wireless manner or via a backhaul in step S41.

Further, the processor 1104 provided in the second base station 132 is configured to acquire the frequency accuracy information indicating the frequency accuracy of the first base station 131 from the first base station 131 adjacent to the second base station 132 in the wireless manner or via the backhaul in step S41.

Although the present disclosure has been described above with reference to the example embodiments, the present disclosure is not limited to the above-described example embodiments. The configurations and details of the present disclosure can be various changed within the scope of the present disclosure to be capable of being understood by those skilled in the art.

For example, some or all of the above-described example embodiments may also be described as Supplementary notes to be described below, but are not limited thereto.

(Supplementary Note 1)

A base station as a first base station, comprising:
at least one memory; and
at least one processor coupled to the at least one memory, wherein the at least one processor is configured to notify a second base station of frequency accuracy information indicating frequency accuracy of the first base station in a wireless manner or via a backhaul.

(Supplementary Note 2)

The base station according to Supplementary note 1, wherein the at least one processor is configured to:
receive a request of the frequency accuracy information of the first base station from the second base station in a wireless manner or via a backhaul, and
notify the second base station of the frequency accuracy information of the first base station in a wireless manner or via a backhaul in response to the request.

(Supplementary Note 3)

A base station as a second base station, comprising:
at least one memory; and
at least one processor coupled to the at least one memory, wherein the at least one processor is configured to acquire, from a first base station, frequency accuracy information indicating frequency accuracy of the first base station in a wireless manner or via a backhaul.

(Supplementary Note 4)

The base station according to Supplementary note 3, wherein the at least one processor is configured to:
detect the first base station using network listening,
request the frequency accuracy information of the first base station in a wireless manner or via a backhaul, from the first base station, and
receive, from the first base station, the frequency accuracy information of the first base station in a wireless manner or via a backhaul in response to the request.

(Supplementary Note 5)

The base station according to Supplementary note 3 or 4, wherein the at least one processor is configured to:
acquire the frequency accuracy information of the first base station in a wireless manner or via a backhaul, from the plurality of first base stations,
select, based on the frequency accuracy information of the plurality of first base stations, a synchronization source base station from the plurality of first base stations, and
synchronize with the first base station selected as the synchronization source base station using network listening.

(Supplementary Note 6)

The base station according to Supplementary note 3 or 4, wherein the at least one processor is configured to:
acquire, from the plurality of first base station, in a wireless manner or via a backhaul, the frequency accuracy information of the first base station, synchronization status information indicating a synchronization status of the first base station, and stratum level information indicating a stratum level of the first base station, the stratum level corresponding to the number of relay base stations existing in a synchronization path between the first base station and the other base station that performs GPS (Global Positioning System) synchronization,
select a synchronization source base station from the plurality of first base stations, based on the frequency accuracy information, the synchronization status information, and the stratum level information of the plurality of first base stations, and
synchronize with the first base station selected as the synchronization source base station using network listening.

(Supplementary Note 7)

The base station according to any one of Supplementary notes 1 to 6,
wherein the frequency accuracy information of the first base station is:
information indicating the frequency accuracy of the first base station when the first base station performs GPS synchronization, and
information indicating cumulative frequency accuracy obtained by adding frequency accuracy of the other base station that performs GPS synchronization, the frequency accuracy of the first base station, and frequency accuracy of a relay base station existing in a synchronization path between the other base station and the first base station when the first base station performs synchronization using network listening.

(Supplementary Note 8)

The base station according to any one of Supplementary notes 1 to 6,
wherein the frequency accuracy information of the first base station is:
information indicating a base station class of the first base station when the first base station performs GPS synchronization, and
information indicating a base station class of the other base station that performs GPS synchronization, the base station class of the first base station, and a base station class of a relay base station existing in a synchronization path between the other base station and the first base station when the first base station performs synchronization using network listening.

(Supplementary Note 9)

The base station according to any one of Supplementary notes 1 to 5,
wherein the frequency accuracy information of the first base station is:
information indicating a stratum level weighted by the frequency accuracy of the first base station when the first base station performs GPS synchronization, and
information indicating a cumulative stratum level obtained by adding a stratum level of the other base station that performs GPS synchronization, the stratum level of the first base station, and a stratum level of a relay base station existing in a synchronization path between the other base station and the first base station when the first base station performs synchronization using network listening.

(Supplementary Note 10)

A communication system comprising:
a first base station; and
a second base station, wherein the first base station is configured to notify the second base station of frequency accuracy information indicating frequency accuracy of the first base station in a wireless manner or via a backhaul.

(Supplementary Note 11)

The communication system according to Supplementary note 10, wherein the second base station is configured to:

detect the first base station using network listening, and request the frequency accuracy information of the first base station in a wireless manner or via a backhaul, from the first base station, and the first base station is configured to notify the second base station of the frequency accuracy information of the first base station in a wireless manner or via a backhaul in response to the request.

(Supplementary Note 12)

The communication system according to Supplementary note 10 or 11, wherein the second base station is configured to:

acquire the frequency accuracy information of the first base station in a wireless manner or via a backhaul, from the plurality of first base stations, select, based on the frequency accuracy information of the plurality of first base stations, a synchronization source base station from the plurality of first base stations, and synchronize with the first base station selected as the synchronization source base station using network listening.

(Supplementary Note 13)

The communication system according to Supplementary note 10 or 11, wherein the second base station is configured to:

acquire, from the plurality of first base station, in a wireless manner or via a backhaul, the frequency accuracy information of the first base station, synchronization status information indicating a synchronization status of the first base station, and stratum level information indicating a stratum level of the first base station, the stratum level corresponding to the number of relay base stations existing in a synchronization path between the first base station and the other base station that performs GPS (Global Positioning System) synchronization, select a synchronization source base station from the plurality of first base stations, based on the frequency accuracy information, the synchronization status information, and the stratum level information of the plurality of first base stations, and synchronize with the first base station selected as the synchronization source base station using network listening.

(Supplementary Note 14)

The communication system according to any one of Supplementary notes 10 to 13, wherein the frequency accuracy information of the first base station is:

information indicating the frequency accuracy of the first base station when the first base station performs GPS synchronization, and information indicating cumulative frequency accuracy obtained by adding frequency accuracy of the other base station that performs GPS synchronization, frequency accuracy of the first base station, and frequency accuracy of a relay base station existing in a synchronization path between the other base station and the first base station when the first base station performs synchronization using network listening based.

(Supplementary Note 15)

The communication system according to any one of Supplementary notes 10 to 13, wherein the frequency accuracy information of the first base station is:

information indicating a base station class of the first base station when the first base station performs GPS synchronization, and information indicating a base station class of the other base station that performs GPS synchronization, the base station class of the first base station, and a base station class of a relay base station existing in a synchronization path between the other base station and the first base station when the first base station performs synchronization using network listening.

(Supplementary Note 16)

The communication system according to any one of Supplementary notes 10 to 12, wherein the frequency accuracy information of the first base station is:

information indicating a stratum level weighted by the frequency accuracy of the first base station when the first base station performs GPS synchronization, and information indicating a cumulative stratum level obtained by adding a stratum level of the other base station that performs GPS synchronization, the stratum level of the first base station, and a stratum level of a relay base station existing in a synchronization path between the other base station and the first base station when the first base station performs synchronization using network listening.

(Supplementary Note 17)

A communication method performed by a base station as a first base station, the method comprising:

a step of notifying a second base station of frequency accuracy information indicating frequency accuracy of the first base station in a wireless manner or via a backhaul.

(Supplementary Note 18)

A communication method performed by a base station as a second base station, the method comprising:

a step of acquiring, from a first base station, frequency accuracy information indicating frequency accuracy of the first base station in a wireless manner or via a backhaul.

(Supplementary Note 19)

A non-transitory computer-readable medium for storing a program that causes a computer to perform a communication method for a base station as a first base station, the communication method including a step of notifying a second base station of frequency accuracy information indicating frequency accuracy of the first base station in a wireless manner or via a backhaul.

(Supplementary Note 20)

A non-transitory computer-readable medium for storing a program that causes a computer to perform a communication method for a base station as a second base station, the communication method including a step of acquiring, from a first base station, frequency accuracy information indicating frequency accuracy of the first base station in a wireless manner or via a backhaul.

This application is based upon and claims the benefit of priority from Japanese Patent Application No. 2020-060940, filed on Mar. 30, 2020, the entire contents of which are incorporated herein by reference.

REFERENCE SIGNS LIST 100, 111 to 116: BASE STATION
101, 103, 121, 122: eNB
102, 104, 105: HeNB
123: ng-eNB
124, 125, 126: gNB
131: FIRST BASE STATION
132: SECOND BASE STATION
201: EPC
202: MME
301, 302: 5GC
401, 402: UE
1001: TRANSMISSION/RECEPTION UNIT
1002: PROCESSING UNIT
1003: STORAGE UNIT
1004: RECEIVER FOR NETWORK LISTENING
1101: RF TRANSCEIVER
1102: ANTENNA
1103: NETWORK INTERFACE
1104: PROCESSOR
1105: MEMORY

The invention claimed is:

1. A base station as a second base station, comprising:
at least one memory; and
at least one processor coupled to the at least one memory,
wherein the at least one processor is configured to acquire, from a first base station of a plurality of first base stations, frequency accuracy information indicating frequency accuracy of the first base station in a wireless manner or via a backhaul,
acquire, from the plurality of first base station, in a wireless manner or via a backhaul, the frequency accuracy information of the first base station, synchronization status information indicating a synchronization status of the first base station, and stratum level information indicating a stratum level of the first base station, the stratum level corresponding to the number of relay base stations existing in a synchronization path between the first base station and the other base station that performs GPS (Global Positioning System) synchronization,
select a synchronization source base station from the plurality of first base stations, based on the frequency accuracy information, the synchronization status information, and the stratum level information of the plurality of first base stations, and
synchronize with the first base station selected as the synchronization source base station using network listening.

2. The base station according to claim 1,
wherein the at least one processor is configured to:
detect the first base station using network listening,
request the frequency accuracy information of the first base station in a wireless manner or via a backhaul, from the first base station, and
receive, from the first base station, the frequency accuracy information of the first base station in a wireless manner or via a backhaul in response to the request.

3. The base station according to claim 1,
wherein the at least one processor is configured to:
acquire the frequency accuracy information of the first base station in a wireless manner or via a backhaul, from the plurality of first base stations,
select, based on the frequency accuracy information of the plurality of first base stations, a synchronization source base station from the plurality of first base stations, and
synchronize with the first base station selected as the synchronization source base station using network listening.

4. The base station according to claim 1,
wherein the frequency accuracy information of the first base station is:
information indicating the frequency accuracy of the first base station when the first base station performs GPS synchronization, and
information indicating cumulative frequency accuracy obtained by adding frequency accuracy of the other base station that performs GPS synchronization, the frequency accuracy of the first base station, and frequency accuracy of a relay base station existing in a synchronization path between the other base station and the first base station when the first base station performs synchronization using network listening.

5. The base station according to claim 1,
wherein the frequency accuracy information of the first base station is:
information indicating a base station class of the first base station when the first base station performs GPS synchronization, and
information indicating a base station class of the other base station that performs GPS synchronization, the base station class of the first base station, and a base station class of a relay base station existing in a synchronization path between the other base station and the first base station when the first base station performs synchronization using network listening.

6. The base station according to claim 1,
wherein the frequency accuracy information of the first base station is:
information indicating a stratum level weighted by the frequency accuracy of the first base station when the first base station performs GPS synchronization, and
information indicating a cumulative stratum level obtained by adding a stratum level of the other base station that performs GPS synchronization, the stratum level of the first base station, and a stratum level of a relay base station existing in a synchronization path between the other base station and the first base station when the first base station performs synchronization using network listening.

7. A communication system comprising:
a first base station of a plurality of first base stations; and
a second base station,
wherein the first base station is configured to notify the second base station of frequency accuracy information indicating frequency accuracy of the first base station in a wireless manner or via a backhaul, and
wherein the second base station is configured to:
acquire, from the plurality of first base station, in a wireless manner or via a backhaul, the frequency accuracy information of the first base station, synchronization status information indicating a synchronization status of the first base station, and stratum level information indicating a stratum level of the first base station, the stratum level corresponding to the number of relay base stations existing in a synchronization path between the first base station and the other base station that performs GPS (Global Positioning System) synchronization,
select a synchronization source base station from the plurality of first base stations, based on the frequency accuracy information, the synchronization status information, and the stratum level information of the plurality of first base stations, and synchronize with the first base station selected as the synchronization source base station using network listening.

8. The communication system according to claim 7, wherein the second base station is configured to:

detect the first base station using network listening, and request the frequency accuracy information of the first base station in a wireless manner or via a backhaul, from the first base station, and the first base station is configured to notify the second base station of the frequency accuracy information of the first base station in a wireless manner or via a backhaul in response to the request.

9. The communication system according to claim 7, wherein the second base station is configured to:

acquire the frequency accuracy information of the first base station in a wireless manner or via a backhaul, from the plurality of first base stations, select, based on the frequency accuracy information of the plurality of first base stations, a synchronization source base station from the plurality of first base stations, and synchronize with the first base station selected as the synchronization source base station using network listening.

10. The communication system according to claim 7, wherein the frequency accuracy information of the first base station is:

information indicating the frequency accuracy of the first base station when the first base station performs GPS synchronization, and information indicating cumulative frequency accuracy obtained by adding frequency accuracy of the other base station that performs GPS synchronization, frequency accuracy of the first base station, and frequency accuracy of a relay base station existing in a synchronization path between the other base station and the first base station when the first base station performs synchronization using network listening based.

11. The communication system according to claim 7, wherein the frequency accuracy information of the first base station is:

information indicating a base station class of the first base station when the first base station performs GPS synchronization, and information indicating a base station class of the other base station that performs GPS synchronization, the base station class of the first base station, and a base station class of a relay base station existing in a synchronization path between the other base station and the first base station when the first base station performs synchronization using network listening.

12. The communication system according to claim 7, wherein the frequency accuracy information of the first base station is:

information indicating a stratum level weighted by the frequency accuracy of the first base station when the first base station performs GPS synchronization, and information indicating a cumulative stratum level obtained by adding a stratum level of the other base station that performs GPS synchronization, the stratum level of the first base station, and a stratum level of a relay base station existing in a synchronization path between the other base station and the first base station when the first base station performs synchronization using network listening.

13. A communication method performed by a base station as a second base station, the method comprising:

acquiring, from a first base station of a plurality of first base stations, frequency accuracy information indicating frequency accuracy of the first base station in a wireless manner or via a backhaul, acquiring, from the plurality of first base station, in a wireless manner or via a backhaul, the frequency accuracy information of the first base station, synchronization status information indicating a synchronization status of the first base station, and stratum level information indicating a stratum level of the first base station, the stratum level corresponding to the number of relay base stations existing in a synchronization path between the first base station and the other base station that performs GPS (Global Positioning System) synchronization, selecting a synchronization source base station from the plurality of first base stations, based on the frequency accuracy information, the synchronization status information, and the stratum level information of the plurality of first base stations, and synchronizing with the first base station selected as the synchronization source base station using network listening.

* * * * *